US009692884B2

(12) United States Patent
Bennett

(10) Patent No.: US 9,692,884 B2
(45) Date of Patent: Jun. 27, 2017

(54) COVERT ON DEVICE COMMUNICATIONS MONITORING

(71) Applicant: World Emergency Network—Nevada Ltd., Carson City, NV (US)

(72) Inventor: Christopher Ryan Bennett, St. Petersburg, FL (US)

(73) Assignee: World Emergency Network—Nevada, Ltd., Carson City, NV (US)

( * ) Notice: Subject to any disclaimer, the term of this patent is extended or adjusted under 35 U.S.C. 154(b) by 106 days.

(21) Appl. No.: 14/741,072

(22) Filed: Jun. 16, 2015

(65) Prior Publication Data
US 2015/0365520 A1    Dec. 17, 2015

Related U.S. Application Data

(60) Provisional application No. 62/012,904, filed on Jun. 16, 2014.

(51) Int. Cl.
| | |
|---|---|
| *H04M 3/42* | (2006.01) |
| *H04M 3/22* | (2006.01) |
| *H04W 4/16* | (2009.01) |
| *H04M 1/725* | (2006.01) |

(52) U.S. Cl.
CPC ..... *H04M 3/2281* (2013.01); *H04M 1/72597* (2013.01); *H04W 4/16* (2013.01)

(58) Field of Classification Search
CPC ...................................................... H03M 3/56
USPC ................................ 379/207.1, 133, 203.01
See application file for complete search history.

(56) References Cited

U.S. PATENT DOCUMENTS

| | | | | |
|---|---|---|---|---|
| 6,400,807 B1* | 6/2002 | Hewitt | ................... | H04M 3/493 379/10.03 |
| 7,194,256 B2* | 3/2007 | Lee | ...................... | H04M 1/2745 370/252 |
| 8,150,368 B2 | 4/2012 | Koch et al. | | |
| 2013/0223288 A1* | 8/2013 | Karnalkar | ......... | H04M 3/53333 370/259 |
| 2014/0080473 A1* | 3/2014 | Bennett | ................... | H04M 11/04 455/419 |

FOREIGN PATENT DOCUMENTS

WO    WO-2013/056156 A1    4/2013

OTHER PUBLICATIONS

PCT International Search Report and Written Opinion for PCT/US15/36030, Sep. 11, 2015, 14 Pages.

\* cited by examiner

*Primary Examiner* — Charles Appiah
*Assistant Examiner* — Randy Peaches
(74) *Attorney, Agent, or Firm* — Fenwick & West LLP

(57) ABSTRACT

Embodiments of the systems and methods described herein relate to covertly monitoring call audio and obtaining other communications of a source device with a target device. For example, a source, with a mobile phone configured as the source device, and working in cooperation with an agency agrees to the interception communications at the source device. A covert application provided to the source device manages configuration of the source device and covert interception of the communications. The intercepting of communications at the source device is performed covertly to protect the source in instances where the source is an undercover informant with the agency.

20 Claims, 17 Drawing Sheets

Map Virtual Number 350A

| Mapping Table 360A ||
|---|---|
| Source Device Transmitting Number 361A | Virtual Number 363 |
| 555-111-2222 ⟷ | 555-999-8888 |
| 555-111-3333 ⟷ | 555-999-7777 |

FIG. 3B

Map Virtual Number 350B

| Mapping Table 360B ||
|---|---|
| Target Device Transmitting Numbers 361B | Virtual Number 363 |
| 555-213-3424 ⟷ | 555-999-8888 |
| 555-234-2345 ⟷ | 555-999-8888 |

FIG. 3C

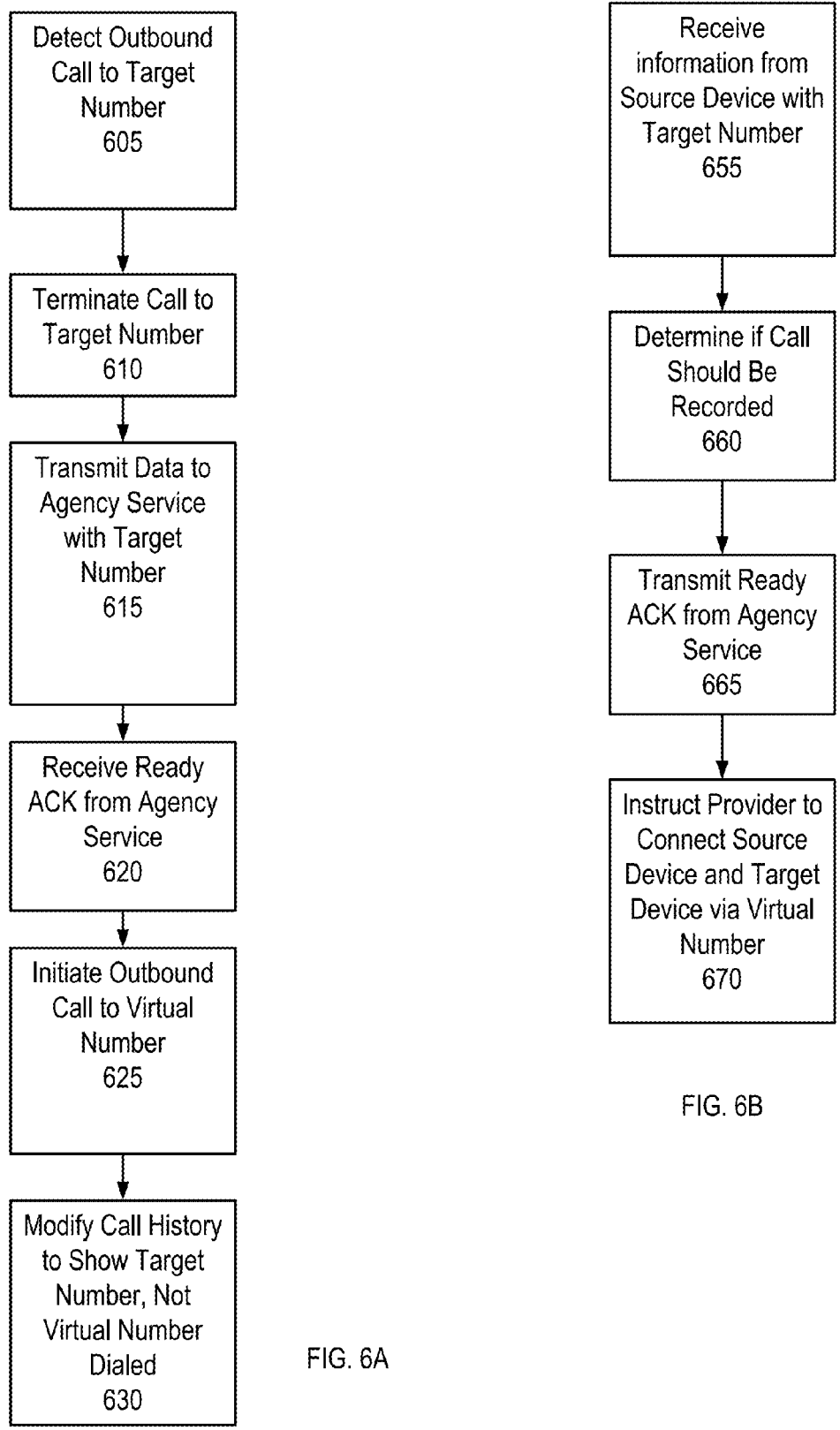

COVERT ON DEVICE COMMUNICATIONS MONITORING

CROSS REFERENCE TO RELATED APPLICATIONS

This application claims the benefit of U.S. Provisional Application 62/012,904, filed Jun. 16, 2014, which is incorporated by reference herein in its entirety.

BACKGROUND

1. Field of Art

The present disclosure generally relates to the field of monitoring communications on a mobile telephonic device.

2. Background of the Invention

Police officers and other agents oftentimes conduct investigations during the course of their duties. In many cases, these investigations require an agent to work with a source for information, which is oftentimes an undercover agent or informant. Typically, the agent relies on the source to relay information pertinent to the investigation when possible. Oftentimes, the information gathered by the source involves telephonic communications the source cannot relay information about to the agent in real time or proximate to when the communication took place, such as when the source is working undercover. This delay presents difficulties to the agent who is in charge of conducting an efficient investigation or providing support to the source.

One option to perform some degree of monitoring of the source is to obtain a consensual wiretap on the source's phone through the source's cellular provider. The cellular provider records calls placed to and from the source's phone and passes the completed recordings to the agent. However, the cost of a consensual wiretap may run in excess of $6,000 per month, if it is even an option with the cellular provider at all. While cost prevents the utilization of wiretapping for all but high priority cases, even when a consensual wiretap is implemented with the cellular provider for the sources line the agent still does not receive information in real time. Further, when performing a consensual wiretap for a source's device in a foreign country, oftentimes the country's government must be provided with information about the source prior to establishing the wiretap, which may jeopardize the identity and safety of the undercover source. Additionally, the recorded data may not be received in real time, and thus, presents difficulties similar to the source relaying information directly.

BRIEF DESCRIPTION OF THE DRAWINGS

The teachings of the embodiments can be readily understood by considering the following detailed description in conjunction with the accompanying drawings.

FIG. 3B is a table illustrating an example embodiment of virtual number mapping for source devices.

FIG. 3C is a table illustrating an example embodiment of virtual number mapping for target devices.

FIGS. 6A and 6B are flow diagrams illustrating methods for covertly monitoring outbound calls on a source device with a virtual number, according to example embodiments.

DETAILED DESCRIPTION

Figure 1A:
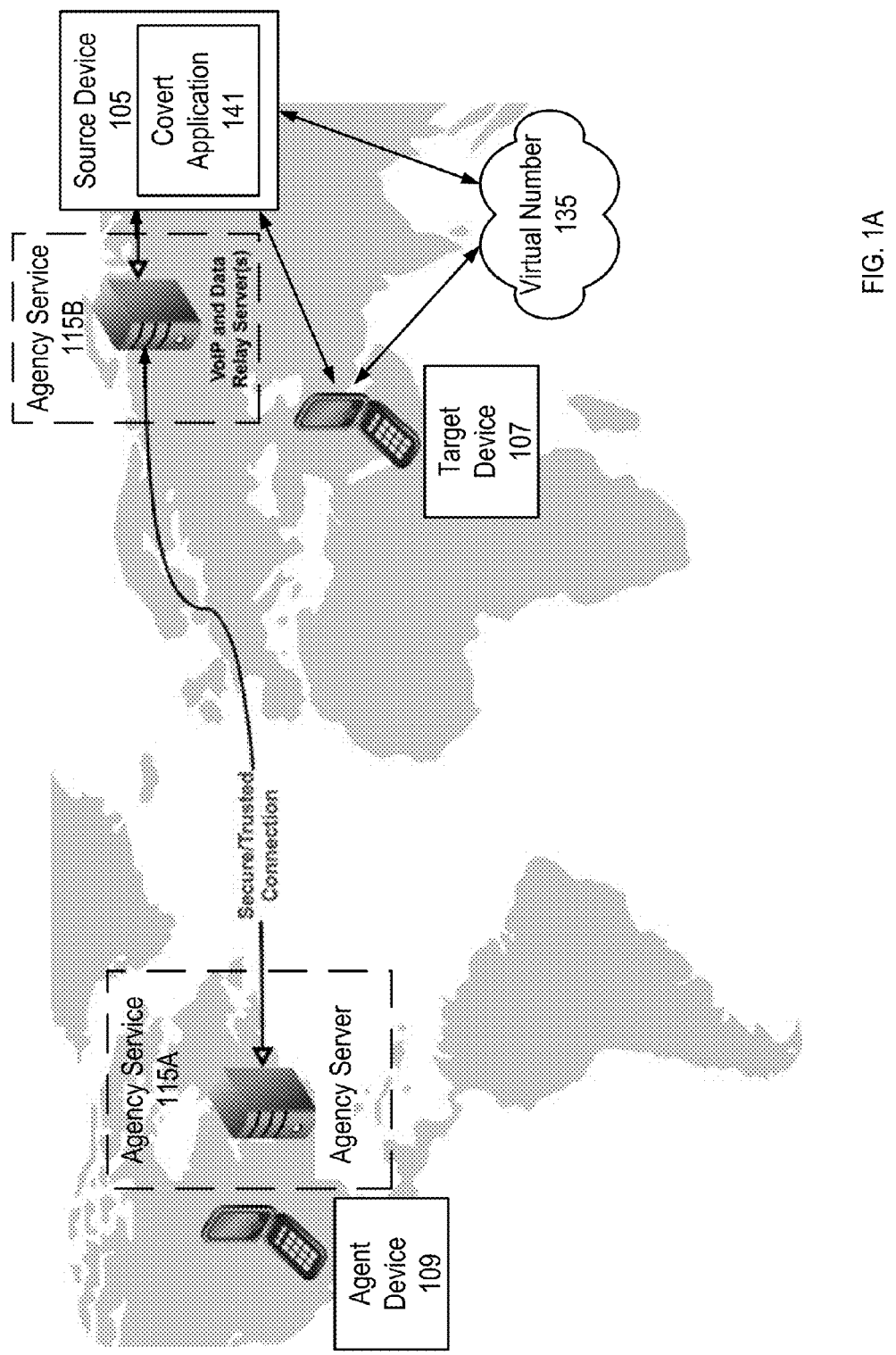
FIG. 1A is a block diagram illustrating an environment for implementing a covert on device monitoring system, according to an example embodiment.

The Figures (FIG.) and the following description relate to preferred embodiments by way of illustration only. It should be noted that from the following discussion, alternative embodiments of the structures and methods disclosed herein will be readily recognized as viable alternatives that may be employed without departing from the principles of the example embodiments.

Reference will now be made in detail to several embodiments, examples of which are illustrated in the accompanying figures. It is noted that wherever practicable, similar or like reference numbers may be used in the figures and may indicate similar or like functionality. The figures depict embodiments for purposes of illustration only.

Overview

A government agency typically supports field agents that work with sources outside the agency during the course of their field duties. Many sources possess a personal mobile device or are issued a mobile device (a source device) such as a mobile phone by the field agent or the agency for communicating with the field agency and/or the agency. In order for the field agent and agency to efficiently monitor communications of the source that take place with the source device, a covert application may be installed on the source device. Depending on the embodiment, the covert application intercepts calls and SMS covertly and provides live monitoring capabilities of calls to the field agent or agency service. For example, the covert application may execute or include at least one module that executes in the background of the operating system for the source device to manage the communications flowing through the source device. Embodiments of the covert application may include a variety of modules providing functionality therein, or may be broken out into individual modules that perform functions for the respective communication types independently. For example, a separate connection module, GPS module, messaging module, protection module, recording module, and registration module may be utilized. The covert application and/or the individual modules may run as a background service and may re-launch if terminated, and are set to start automatically in the background when the phone reboots. The function of modules on the mobile device may be concealed by the protection module such that the user of a mobile device executing the covert application may not interface with them directly or made aware of the operations the module(s) perform in the background.

The covert application intercepts communications between the source devices and one or more target devices (or all communications of the source device) on one or more particular communication services available to the source device such as telephonic or SMS communications. For some communication services, such as telephonic ones, in an embodiment the covert application intercepts communications on the source device by replacing a traditional wireless telephonic communication channel to be established between the source device and a target device with a channel routed through a virtual number. In some embodiments, the covert application covertly performs the operations associated with the replacing the traditional communication channel with the communication channel through the virtual number on the source device, such as in the background on the operating system so that a user of the source device is unaware of the replacing and routing. Agents and/or the agency service may utilize the virtual number to monitor, in real time, the communications intercepted by the covert application on the source device.

In another embodiment, a virtual number may not be available in the location of the source device or otherwise configured with the covert application for the source device. Instead of utilizing a virtual number, the covert application intercepts communications by monitoring for audio on a traditional wireless telephonic communication channel between the source device and target device and establishing a separate VOIP communication channel with a VOIP endpoint for transmitting the audio from the traditional communication channel and that may be monitored by the agent or agency service. Thus, the user may interact with the native applications on the phone to send and receive communications that are intercepted by the covert application in the background.

Embodiments of systems and methods described herein relate to covertly monitoring call audio and obtaining other communication activities such as SMS at the source device. The source, working in cooperation with an agency, agrees to the interception of all monitored communication types or selects communication types for monitoring at the source device. The intercepting of communications at the source device often must be done covertly to protect the source, for example, in instances where the source is an undercover informant with the agency.

In the case of intercepting telephony call audio on the source device, incoming and outgoing telephonic communications may be routed through a virtual number configured for covertly establishing a connection between the parties and facilitating the recording of call audio. In other embodiments, a VOIP communication channel may be established between the source device and a VOIP endpoint in parallel to a communication channel (e.g., telephony call) between the source device and another party. Other communications such as SMS may be intercepted, copied, and transmitted to the agency via a wireless data connection. In any instance, the processes of intercepting communications are performed covertly and traces of the activities performed to that end are hidden such that intercepted communications between the source device and target device appear to have transpired as normal.

In some embodiments, an agency may desire to intercept audio on a source device that is placing a call to a target device by utilizing a virtual number. A covert application for intercepting audio communications on the source device with a virtual number is provided to the source device. The covert application detects outbound connection requests on the source device to the target device and terminates the connection requests for replacement with connections routed through a virtual number. The covert application terminates an outbound connection request such that the outbound connection request attempted by the source device continues to appear in progress. The covert application transmits data about the attempted outbound connection request such as the number of the target device the source device attempted to communicate with to the agency service. In turn, the covert application receives a ready acknowledgement (ACK) from the agency service and covertly initiates an outbound connection request to the virtual number through which communications between the source device and target device are established. The ready ACK may include information about the virtual number the covert application should initiate the connection request to or the covert application may store information about the virtual number to use locally (e.g., received during a registration with the agency service). The covert application modifies call history on the source device to scrub traces of communications through the virtual number and updates call details for the terminated outbound connection request with those from the communication session with the virtual number. Specifically, the covert application updates any indication that the attempted outbound connection request was terminated with an indication of the outbound connection request being successful (or not) based on whether establishing communication between the source device and target device through the virtual number was successful (or not). Additionally, the covert application updates communication session details such as duration of the terminated outbound connection request with those of the communication session with the virtual number.

In some embodiments, an agency may desire to intercept audio on a source device placing a call to a target device by utilizing a virtual number. The source device includes covert application configured to transmit data about the target device such as a number of the target device to the agency service in response to detecting an attempted outbound connection request to the target device. The agency service receives the data about the target device and determines whether communications between the source device and the target device should be recorded. The agency transmits a ready ACK to the source device, which causes the covert application to initiate an outbound connection request from the source device to the virtual number. The agency instructs the provider to connect to the source device with the virtual number, through which communications between the source device and the target device may be recorded. The agency service may determine the appropriate virtual number to authorize the source device to communicate through from a mapping table storing source device information in association with virtual number information. To establish communications between the source device and the target device, the agency service instructs the provider to initiate a connection request to the target device and connect the target device with the source device via the virtual number. The agency service may instruct the provider to configure the virtual number or otherwise initiate the connection request to the target device such that it appears to originate from the source device and not the virtual number. For example, the agency service may instruct the provider to configure the virtual number with source device information stored in the mapping table or with source device information received at the virtual number in response to the source device's connection request to the virtual number.

In some embodiments, the covert application on the source device receives mapping table information corresponding to target devices for which communications to/from the source device should be monitored. When an attempted outbound communication from the source device is detected, the covert application may determine to intercept the communication session if the outbound communication is to a target device specified in the received mapping information. Alternatively, the covert application may receive instructions in the ready ACK to either dial the virtual number or (re-)initiate a normal outbound communication request to the device (e.g., when the agency service determines that the communications attempt is not to a target device stored in the mapping table).

In some embodiments, if the covert application does not receive a ready ACK from the agency service, the covert application may initiate a normal outbound communication request from the source device to the target device and establish a parallel VOIP connection enabling monitoring of the communications between the source device and the target device.

In some embodiments, an agency may desire to intercept audio on a source device that is receiving a call from a target device made to the source device by utilizing a virtual number. A covert application for intercepting audio communications on the source device with a virtual number is provided to the source device. The covert application may instruct a provider (e.g., of telephonic communication services to the source device) to forward all incoming calls to the source device to the virtual number. In turn, instead of receiving a connection request from the target device at the source device, the covert application device receives a notification that an incoming connection request from the target device has been routed to the virtual number. The notification includes information about the target device, which the covert application utilizes to generate an interface and perform operations mimicking that of an incoming connection request at the source device having originated from the target device. The notification may also include information about the virtual number for the covert application to initiate a connection request to in order to establish communications between the source device and the target device though the virtual number. Alternatively, the covert application may store information about the virtual number to use locally (e.g., received during a registration with the agency service). As the incoming connection request is passed to the virtual number, the source device does not receive the incoming connection request. Accordingly, in response to the notification of the incoming connection request, the covert application utilizes the notification to generate an interface and perform operations mimicking an incoming connection request appearing to originate from the target device to the source device, as would occur in the case of an incoming connection request originating from the target device. The interface generated by the covert application on the source device may display options on the source device for acting on the mimicked connection request from the target device. Example options for selection may include acceptance of the mimicked connection request, silence of the mimicked connection request, rejection of the mimicked connection request, and no selection at all. The covert application detects the selection of an option for acting on the mimicked connection request and sends a selection ACK describing the selection to the agency service. Additionally, the covert application mimics operation of the source device corresponding to the detected selection of an option for acting on the mimicked connection request, as would be the case of a similar selection in response to a connection request originating from the target device. In the case of a selection to accept the mimicked connection request from the target device, the covert application initiates a connection request to the virtual number to establish communications between the source device and the target device. In any instance, the covert application modifies the call history on the source device to reflect the detected selection for the mimicked connection request. For example, in the case of a selection to accept the mimicked connection request, the covert application modifies call history on the source device to scrub traces of communication established though the virtual number and updates call details for the mimicked connection request with that of the communication session through the virtual number.

In some embodiments, an agency may desire to intercept audio on a source device that is receiving a call from a target device by utilizing a virtual number. When the target device dials the source device to initiate an incoming connection request, the provider has been instructed (e.g., by an agency service or covert application on the source device) to automatically forward the incoming connection request to the virtual number. The agency service, having provisioned the virtual number with the provider, receives information about the target device and the virtual number in response to incoming connection request. The agency service instructs the provider to connect the target device with the virtual number and play a ringing sound on the virtual number to the target device while awaiting action from the source device. Accordingly, to the target device, a connection appears to have not yet been established prior to action from the source device. The agency service notifies the covert application of the incoming connection request from the target device. As the incoming connection request is passed to the virtual number, the source device does not receive the incoming connection request. Accordingly, in response to the notification of the incoming connection request, the covert application utilizes the notification to generate an interface and perform operations mimicking an incoming connection request appearing to originate from the target device to the source device, as would occur in the case of an incoming connection request originating from the target device. The interface generated by the covert application on the source device may display options on the source device for acting on the mimicked connection request from the target device. The agency service may determine the appropriate source device from a mapping table storing source device information in association with virtual number information. Additionally, based on the target device information received from the provider, the agency service may determine whether communications between the source device and the target device are to be monitored. The agency service receives a selection ACK describing any selection of an option for acting on the mimicked connection request made at the source device as to acceptance of the mimicked connection request, silence of the mimicked connection request, rejection of the mimicked connection request, and no selection at all. In the case of receiving a selection ACK to accept the mimicked connection request appearing to originate from the target device, the agency service instructs the provider to establish communications between the source device and the target device via the virtual number. For example, the agency service instructs the provider to stop playing the ringing sound on the virtual number in response to receiving a connection request to the virtual number from the source device. In the case of receiving a selection ACK to silence to the mimicked connection request at the source device or that no action was taken, the agency service may instruct the provider to stop playing the ringing sound on the virtual number to the target device after a standard duration (e.g., 6, 9, or 12 seconds) and instruct the provider to send the target device to a voicemail of the source device. In the case of receiving a selection ACK to reject the mimicked connection request at the source device, the agency service may instruct the provider to immediately send the target device to a voicemail of the source device.

As communications between the source device and target device are established through the virtual number, audio may be recorded via the virtual number. Thus, for example, a source device may be covertly recorded when placing and receiving calls with a target device. Additionally, depending on the embodiment, one or more agent devices are further configured to access and listen in on the communications routed through the virtual number. For example, the agent devices may access a web interface, API or execute a standalone monitoring application for viewing source device and virtual number details and collected communications information. In some embodiments, an authorized agent device may establish a connection with the virtual number as communications between the source device and the target device are taking place. To prevent the agent device from tipping off another party, audio from the agent device on the connection with the virtual number may be disabled to prevent any indication the communications are being monitored. In some embodiments, the agency service may instruct the provider to initiate a connection request to an agent device with audio from the agent device disabled such that an agent utilizing the agent device may choose to monitor the communications between the source device and the target device through the virtual number in real time.

In some embodiments, an agency may desire to intercept audio from source device communications with a target device using a parallel VOIP connection. A covert application for intercepting audio on the source device with a parallel VOIP connection is provided to the source device, such as by an agency service. The covert application detects outbound and inbound connection requests between the source device and a target device and determines whether to intercept the communications between the source device and the target device. For example, the covert application may check a local database to determine whether communications with the target device should be intercepted. If the communications with the target device should be intercepted, the covert application begins recording audio from the communications of the source device with the target device. The covert application opens a parallel VOIP connection with a VOIP endpoint, such as a VOIP endpoint established by the agency service, to transmit the recorded audio. The covert application may determine the VOIP endpoint from the local database (e.g., received during a registration with the agency service). The covert application detects termination of the communications between the source device and the target device, stops the recording of audio, and terminates the VOIP connection with the VOIP endpoint once transmission of the recorded audio is complete. Additionally, the covert application detects when the source device has access to a WiFi or other high-speed connection (e.g., 4G LTE) and uploads a high-quality version of the recording as the audio transmitted over VOIP may be down sampled based on the capabilities of the wireless network available at the time of the communications between the source device and the target device.

An agency may coordinate with an agency service for configuring the source device with the covert application and to fulfill the roles of remote setup, management and recording (e.g., evidence collection) for intercepting communications on the source device. The configuration can take place over-the-air such that a given telephonic device is conveniently enabled as a source device. Additionally, if the agency desires to intercept communication across multiple devices, multiple source devices may be configured and managed independently on an as-needed basis.

Example embodiments described herein relate to implementing covert monitoring of communications over a wireless radio network (e.g., PSTN, Cellular Network, and/or WiFi) for network capable devices, such as a mobile phone or VOIP capable phone configured (e.g., with a covert application) as a source device.

As mobile phones and similar devices are commonly carried by sources, mobile phones offer an existing platform for covertly monitoring source communications with specified targets or all communications. Additionally, with the popularity of smart phones and feature phones, additional monitoring and safety features may be integrated into the source device with a covert application for enhancing operational viability in the field. For example, the cover application executing on the source device may be configured to collect additional valuable real-time data such as Global Positioning System ("GPS") coordinates relating to whether the source device was located when communications between the source and the target took place.

The source device may subsequently transmit all or a portion of the collected real-time data and communications audio over existing channels (e.g., a network) back to the agency, agency service or another entity. Embodiments of the agency, agency service and/or other entities within the covert on device monitoring system receive the collected data for storage and/or live streaming to agent devices and records. Depending on the embodiment, the agent devices are further configured to access and present (e.g., play and/or display) a variety of the real-time and historical data stored on or streamed by the source device on the network in addition to inviting source devices to participate in the covert on device monitoring system. For example, the agent device may access a web interface, API or execute a standalone monitoring application for viewing active communications, retrieving audio data from active or historic communications, selecting services and targets for the covert application on the source device for intercept communications therewith, and viewing other information associated with covert on device monitoring.

Environment and Implementation of the Covert on Device Monitoring System

FIG. 1A is a block diagram illustrating an environment 100 for implementing a covert on device monitoring system, according to an example embodiment. As shown the environment 100 includes an agency support service provider "agency service" 115, a source device 105, a target device 107, and an agent device 109.

Agency service 115 represents a collection of compute devices (e.g., servers) and related storage mediums that are configured for performing various activities such as configuring source device for convert on device monitoring of communications, exchanging data over a network and storing data in support of one or more agencies (not shown), source devices, and agent devices. For example, the agency service 115 may include one or more modules providing ascribed functionality to an agency via an application programming interface ("API") or web interface, collectively "the monitoring interface", as described in more detail with reference to FIG. 1B. The agency service 115 may also include infrastructure for providing audio communicability (e.g., internally and/or over the network 120) within the monitoring interface using the public switched telephone network ("PSTN") and voice over internet protocol ("VoIP").

In an embodiment, the source device 105 is a mobile telephonic device capable of collecting data and transmitting data (e.g., wirelessly) over a network such as a telephony network, telephony data network, and/or wireless internet connection such as WiFi. Some examples of a source device 105 include a mobile phone, tablet or notebook computer. Example embodiments of the source device 105 as a mobile phone include feature phones and smart phones. Accordingly, a given mobile phone or other device operated as a source device 105 may not necessarily include or support all of the functionality ascribed herein to the source device or covert monitoring system system due to inherent differences in device capabilities.

In one embodiment, the source device 105 executes a covert application 141 for automating the interception of communications on services available to the source device and data collection for covertly monitoring the source device. The covert application 141 may coordinate interception of communications on the services available to the source device locally on the source device 105 and/or interface with the agency service 115 (and/or a service provider, not shown, providing network capacity to the source device) to coordinate interception of communications. An example embodiment of a covert application 141 for covert on device communications monitoring is described in more detail with reference to FIG. 2.

Target devices 107 communicate with the source device 105 (e.g., via SMS or telephonically) and the communications between the source device and the target device are optionally monitored. Embodiments of the various target devices 107 include any network capable device that may send or receive information associated with a transmitting number (e.g., on a telephony network). Accordingly, as referred to herein, a target device 107 is a mobile or stationary device capable of connectivity (e.g., wireless or wired) to a network for sending or receiving information over the internet, PSTN and/or cellular network to/from the source device 105. Some examples of a target device 107 include a mobile phone, land-line phone, tablet and notebook or desktop computer. The agent device 109 may interface with the agency service 115 to select the services (e.g., telephony, SMS) available to the source device 105 the covert application 141 should intercept communication on and optionally specify specific target devices 107 to intercept.

Additionally, an agent device 109 may monitor communications intercepted at the source device 105. As referred to herein, an agent device is a mobile or stationary device capable of connectivity (e.g., wireless or wired) to a network such as an agency network, the internet, PSTN and/or cellular network. Some examples of an agent device 109 include a mobile phone, land-line phone, tablet and notebook or desktop computer. Example embodiments of the agent device 109 as a mobile phone can include feature phones, smart phones or standard mobile phones.

FIG. 1A also illustrates a virtual number 135 configured for use on a telephony network to monitor communications between the source device 105 and the target device 107 according to some embodiments. In some embodiments, the agency service 115 provisions and configures the virtual number 135 and coordinates connection requests to/from the virtual number with the source device 105, target device 109, and optionally the agent device 109 to monitor audio communications between the source device and target device.

FIG. 1A also illustrates a home agency service 115A and remote relay agency service 115B configured for use on a network to monitor communications between the source device 105 and the target device 107 according to some embodiments. Other embodiments may not include a remote relay agency service 115B. In some instances, a particular network provider available to the source device 105 may not provide or otherwise include communication capabilities through a virtual number 135, thus preventing covert monitoring of communications via the virtual number when the source device utilizes the service provider's network. For example, a particular service provider in a given country may not provide virtual number services. However, the service provider may provide data network services (e.g., a connection to the internet) in addition to telephony network services. The covert application 141 may intercept communications on the source device 105 by detecting communications with the target device 107 and, utilizing the data connection, open a VOIP connection to a VOIP endpoint (e.g., with the agency service 115) in parallel to the active telephony communications channel and transmit audio data recorded on the source device from the communications between the source device and the target device over the VOIP connection without utilizing a virtual number.

In some embodiments, a remote relay agency service 115B is established as a VOIP endpoint geolocated proximate to the source device 105. As some countries and/or providers monitor connections from their network to VOIP endpoints outside the country, a VOIP endpoint within the country can collect VOIP voice data received from the covert application 141 and transmit the data to the home agency service 115A over a secure and trusted connection to provide information collected through the monitoring service.

Additionally, the covert application 141 may intercept messages on the source device 105 by detecting the sending and receiving of messages such as SMS messages. The covert application 141 packages the message contents and information about the message such as send/receive times, the source device 105, the target device 107, and a location of the source device 105 and transmits the package (e.g., over a data connection) to the agency service 115. In some embodiments, the package is encrypted prior to transmission to the agency service 115.

As described above, the agency service 115 provisions and configures virtual numbers 135 and handles number information for the virtual numbers to establish identities for the virtual numbers on the network 120. In some embodiments, the agency service 115 provisions and configures the virtual number 135 and coordinates connection requests to/from the virtual number by the source device 105, target device 107, and optionally the agent device 109 to monitor audio communications between the source device and target device. For example, the agency service 115 may maintain a mapping table storing transmitting numbers for source devices and/or target devices 107 for monitoring in association with the virtual numbers 135. Utilizing the mapping table, the agency service 115 may identify devices requesting a connection with the virtual number 135 based on number information for the requesting device received from the provider. Thus, for example, the agency service 115 may identify connection requests to the virtual from source devices, target devices, and agent devices.

In the case of establishing communications through the virtual number 135 between the source device 105 and the target device 107, the agency service 115 may instruct the provider to establish the communications the parties while additionally notifying an agent device 109 of the communications based on a transmitting number of the agent device 109 stored in the mapping table in association with the virtual number 135. The notifications themselves may come in different forms and are explained in more detail below.

As used herein, the term "application" or "module" refers to computer program instructions and/or other logic used to provide the specified functionality. Thus, an application or a module can be implemented in hardware, firmware, and/or software. In one embodiment, program modules or application are formed of executable computer program instructions stored on a non-transitory storage device or computer readable storage medium, loaded into memory, and executed by a computer processor as one or more processes.

As used herein, the terms "message," "messaging," and "short messaging service (SMS)" each comprise the breadth of messaging services and related technologies or standards used for communicating and transmitting data over a network. These technologies and services include SMS messages, multimedia messaging service "MMS" messages, proprietary messaging service messages such as BLACKBERRY messages "BBM," Apple iMessages, and the like.

Figure 1B:
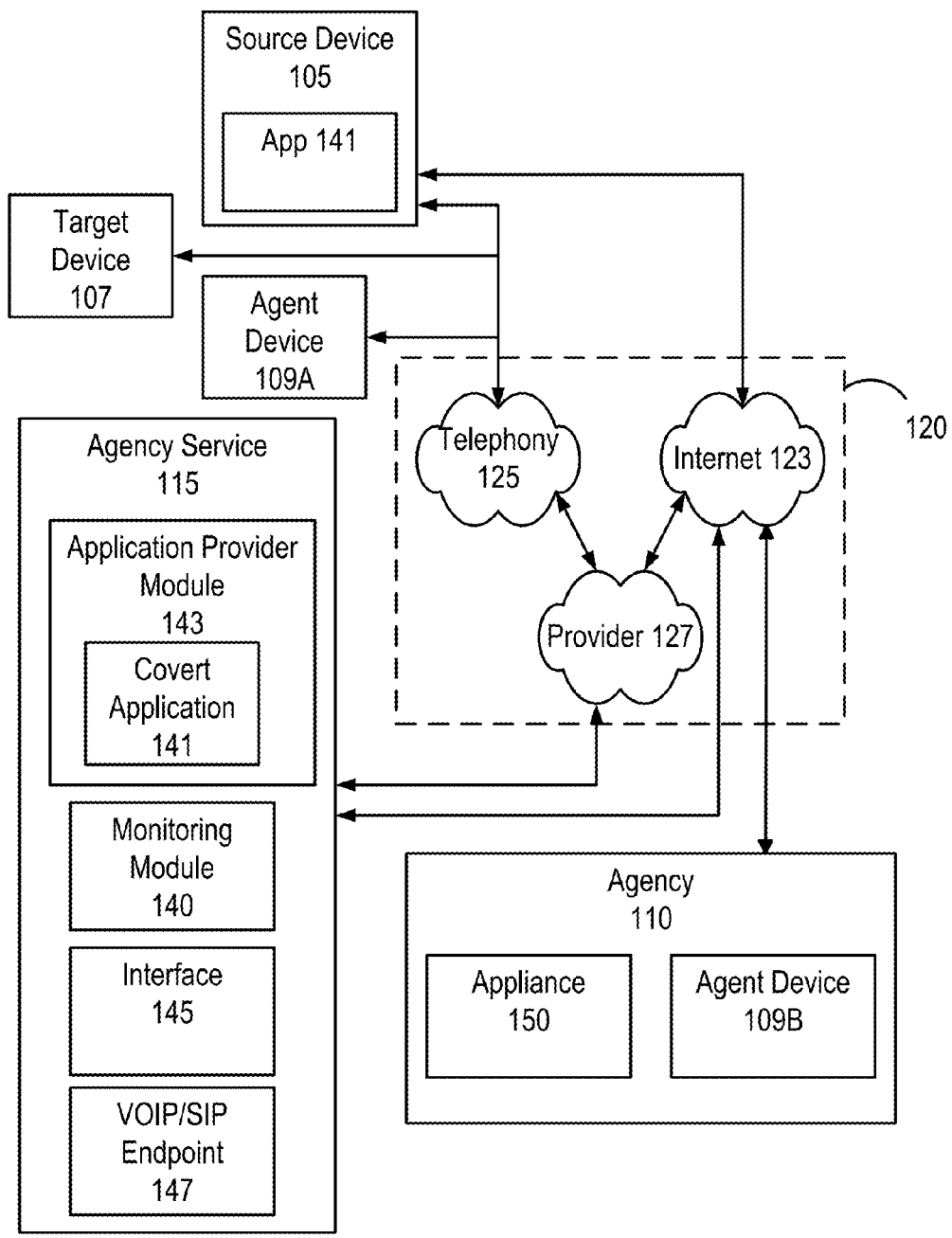
FIG. 1B is a block diagram illustrating an operating environment of an agency service providing a covert on device monitoring system, according to an example embodiment.

FIG. 1B is a block diagram illustrating an operating environment of an agency service 115 providing a covert on device monitoring system, according to an example embodiment. As shown, the operating environment includes an agency 110, agent device devices 109, source device 105, target device 107, agency service 115, and a network 120 with components such as the internet 123, telephony 125 and provider 127 networks. The network 120 may also include GPS satellites (not shown) that relay position data to the source device 105 and other devices.

The network 120 represents the communication pathway between agency 110, agency service 115, source device 105, target device 107, agent devices 109 and other entities (not shown). In one embodiment, the network 120 includes standard communications technologies and/or protocols and can include the Internet and PSTN. Oftentimes, these communications technologies and/or protocols carry both PSTN and Internet related data. Thus, the network 120 can include links using technologies such as Ethernet, 802.11, worldwide interoperability for microwave access (WiMAX), 2G/3G/4G mobile communications protocols, worldwide interoperability for PSTN communications, digital subscriber line (DSL), asynchronous transfer mode (ATM), InfiniBand, PCI Express Advanced Switching, etc. Thus, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including analog audio (e.g., for last mile PSTN communications), digital audio and video (e.g., as a file or streaming with Real Time Streaming Protocol), the hypertext markup language (HTML), the extensible markup language (XML), JavaScript, JSON, VBScript, FLASH, the portable document format (PDF), Voice Over Internet Protocol (VOIP) data etc. In addition, all or some of the data exchanged over the network 120 can be encrypted using conventional encryption technologies such as secure sockets layer (SSL), transport layer security (TLS), virtual private networks (VPNs), Internet Protocol security (IPsec), etc. In another embodiment, the entities on the network 120 can use custom and/or dedicated data communications technologies instead of, or in addition to, the ones described above. For example, some government agencies and the military may operate networks auxiliary to the internet and PSTN.

Agency 110 represents a collection of servers, desktop, notebook or tablet computers, mobile telephones and related storage mediums utilized by the agency and respective respective agency personnel for executing applications or modules to communicate with and receive data from the agency service 115 (e.g., via the interface 145) and other entities on the network 120. For example, agency 110 devices may execute a web browser to access a web interface or execute a mobile or desktop application for communicating with an API provided by the agency service 115. An agency 110 may also include telephonic infrastructure enabling audio communicability (e.g., internally and/or over the network 120) using the public switched telephone network ("PTSN") or VOIP services for monitoring source device 105 communications over virtual numbers or parallel VOIP connections.

The telephony network 125 may include servers, switches and other hardware and software for implementing, among other protocols and technologies, worldwide interoperability for PSTN communications including land-lines and 2G/3G/4G wireless protocols. The telephony network 125 also provides mobile devices with the capability to transmit and receive data such as packaged messages or VOIP data over the internet 123. The telephony network 125 is managed by one or more communication service providers 127 that own telephone numbers for use on the PSTN and the providers own network (e.g., a wireless telephony 125 network components that communicate with the PSTN) and data uplinks from their own networks to the internet 123 for transmitting data.

The provider 127 may include servers, wireless access points, switches and other hardware and software for communicating over the network 120. The provider 127 buys or leases numbers for use on the telephony network 125. The provider 127, in turn, manages numbers provisioned for use by the agency service 115 and the telephony traffic associated with the numbers. In one embodiment, the agency service 115 provisions one or more of the numbers managed by the provider 127 as virtual numbers over the network 120. Different providers 127 may provide services to the source device 105, target device 107, and/or agent device and virtual number services.

Typically, a number used on the telephony 125 network directs to a given mobile device, VoIP device or land-line device having an associated number identity characterized by automatic number identification "ANI" information, or caller identification. Virtual numbers, while still operable with the PSTN networks, are associated with the provider 127 who handles telephony traffic for the number. Because a virtual number does not direct to an end user device, the provider 127 may facilitate operations to establish connections with devices through the virtual number, record call information for connections on the virtual number such as call audio and caller history (e.g., on a computer readable medium), and stream/provide call information for download (e.g., over the network 120).

The provider 127 may also pass/bridge audio (bidirectional or unidirectional) in real-time between two or more telephonic devices requesting and/or establishing connections with the same or different virtual numbers (or connected by the provider 127 via a virtual number). Additionally, as the virtual numbers are handled by the provider 127, the agency service 115 may transmit instructions to the provider 127 to modify number information such as ANI information and caller identification associated with the virtual number used for initiating connection requests from the virtual number.

In addition to provisioning virtual numbers for the agency service 115, the provider 127 communicates notifications and data associated with the virtual numbers to the agency service 115, agent devices 109, or other entity such as the agency 110. For example, the provider 127 may notify the agency service 115 (and optionally agent device 109) of an incoming caller to the virtual number and receive instructions from the agency service 115 to connect the caller with the virtual number (or another device) to initiate monitoring and recording of audio. In a specific example, the agency service 115 may provide instructions for the provider 127 to notify an agent device (e.g., 109A) in response to use of the virtual number for communications between the source device 105 and the target device 107. The provider 127, in turn, may request a connection with the agent device 109A by dialing out to the agent device 109A via the virtual number (or other virtual number) and pass (or bridge) audio such that the agent device 109 receives the audio communications established between the source device 105 and the target device 107 through the virtual number. The provider 127 may also receive instructions to stop/start recordings of audio communications established the virtual number and interface with a transcription service to transcribe recorded call audio. In turn, the provider 127 can transmit the recordings and transcripts to the agency service 115 or other entity on the network 120.

Additionally, the provider 127 may enable or disable inbound and/or outbound audio for different parties such as an agent device 109 connecting to a virtual number and recordings thereof responsive to instructions received (e.g., via an API) from the agency service 115. The provider 127 can receive instructions for managing a virtual number and notifications as part of the provisioning process, prior to an incoming call or in real-time from the agency service 115 for establishing connections with the virtual number.

In an embodiment, the agency service 115 includes a monitoring module 140 to provision and map virtual numbers for source devices registering with the monitoring service. A request for a virtual number with the provider 127 may include number information for provisioning virtual numbers such as an area code (e.g., 395) and country code (e.g., +44). For example, the monitoring module 140 queries the provider 127 for available virtual numbers matching the request and claims a virtual number from the matching virtual numbers for monitoring communications.

The monitoring module 140 may specify number information such as ANI and/or caller identification information for association with the virtual number to spoof the number identity of the virtual number on the network 120. Thus, for example, outbound caller information (e.g., for outbound connection requests from the virtual number placed to a target device 107) for the virtual number may match that of the source device 105. Accordingly, the monitoring module 140 may transmit instructions to the provider 127 for modifying the number identity for initiating an outbound connection request from the virtual number. When a virtual number is no longer needed by the agency 110, the monitoring module 140 obtains any audio recordings or call logs associated with the virtual number and releases the number back to the provider 127.

Additionally, the monitoring module 140 may optionally specify number information such as a ring tone for provisioned virtual numbers. The specified ring tone may be used to spoof the location where the number is being used on the network 120 or mimic a custom ringtone when played for the target or other device. Specifically, as ring tones can differ between countries, and for a host of other reasons, the monitoring module 140 may instruct the provider 127 to configure the virtual number such that a specified ring tone is played when a party is requesting to establish a connection with the virtual number.

In a real world example, if the virtual number is based in the United Kingdom and the target expects the source, and thus the source's device being monitored using the virtual number, to be in the United States, the target may hear (incorrectly) the ring tone for the United Kingdom when forwarded through to the virtual number (rather than the expected United States ring tone). Accordingly, the monitoring module 140 may manage a list of ring tones (e.g., for different countries) and/or enable the upload of a desired ring tone for playback to a party dialing the virtual number. The monitoring module 140, in an embodiment, may monitor the location of the source device 105 and/or receive location updates (e.g., via covert application 141) for the source device 105 for determining the ringtone automatically. The monitoring module 140, in turn, transmits instructions to the provider 127 for configuring the virtual number with the desired ring tone for playback. Thus, the cover of the source may be maintained when establishing communications through the virtual number.

The monitoring module 140 may include mapping information for configuring the function of claimed virtual numbers and identifying devices associated with virtual numbers in a mapping table. Depending on the desired configuration, the mapping information may include device information such as the transmitting number of a source device 105, agent device 109 authorized to monitor communications of the source device, and target devices 107 for which communications with the source device 105 should be monitored, along with any specified ring tone that should be played to a device when requesting to connect to the virtual number.

Thus, example embodiments of the mapping table may indicate whether a specific ring tone or ringtones should be used for attempted connections of devices with the virtual number 135. Additionally, embodiments of the mapping table may also identify operations for the covert application 141 to perform on the source device 141.

In practice, the monitoring module 140 consults the mapping table to automatically identify a device requesting a connection with a virtual number as the source device 105, target device 107 or agent device 109 based on the transmitting number of the requesting device. Thus, for example, the covert application 141 may perform operations on the source device 105 to request a connection with a virtual number mapped to the transmitting number of the source device 105. In turn, the monitoring module 140 identifies the source device 105 and instructs the provider to connect the source device to the virtual number, such as to establish communications between the source device and a target device 107 that initiated a connection request forwarded to the virtual number.

Embodiments of the monitoring module 140 use the mapping of the source device 105 and target device 107 to a virtual number for instructing the provider 127 to automatically connect target device 107 with the virtual number and play a ring tone to the target device. In turn, the mapping of the source device 105 to the virtual number is identified in the mapping table to instruct the covert application 141 on the source device 105 to connect to the virtual number to establish communications between the source device and the target device through the virtual number. Additionally, embodiments of the monitoring module 140 use the mapping of the source device 105 to a virtual number for identifying the virtual number to establish communications through when the covert application 141 notifies the agency service 115 the source desires to communicate with a particular target device 107. The covert application 141 provides information about the target device 107 such as the transmitting number of the target device to the monitoring module 140. The monitoring module 140 instructs the provider 127 to initiate a connection request from the virtual number to the target device 107 such that it appears to originate from the source device 105 (e.g., using the information stored in the mapping table for the source device). The covert application 141 also initiates a connection request to the virtual number, thereby allowing the source to communicate with the target.

Alternatively, the agency service 115 may receive the notification the source device 105 desires to communicate with a target device and instruct the covert application 141 (e.g., by transmitting a ready ACK to the source device) to initiate a connection request to the virtual number when the virtual number is ready for monitoring. In turn, the covert application 141 initiates a connection request to the virtual number. In this case, the monitoring module 140 may instruct the provider to use the number information for the source device 105 provided by way of the notification received from the source device 105 requesting to communicate with the target device 107 for initiating the connection request from the virtual number to the target device 107 such that it appears to originate from the source device. Further, the monitoring module 140 may instruct the provider 127 to establish a connection with the source device 105 when the source device 105 requests as connection with the virtual number in response to receiving the ready ACK.

Additionally, embodiments of the monitoring module 140 can use the mapping of agent devices 109 to virtual numbers for instructing the provider 127 to automatically initiate a connection request to (e.g., from the associated virtual number) or otherwise notify (e.g., a SMS message) agent device 109 of communications taking place between the source device 105 and the target 107 via the virtual number or when other communications of the source device 105 such as SMS messages are available for viewing. The agency service 115 may also notify agent device 109 through interface 145 or via email.

In order to provide monitoring services, the agency service 115 registers source devices 105 with the monitoring system. For example, the agent service 115 may receive a request to register a specified source device 105 via interface 145 from the agency 110 or agent device 109. The request to register the source device 105 may include the transmitting number of the source device 105, email, or other communication method accessible by the source device. In one embodiment, the covert application provider module 143 receives the information about the communication method available to the source device 105 and transmits registration information on the communication method accessible by the source device 105. For example, the covert application provider module 143 may transmit a link to the source device 105 in a message on a message service or in an email. When the link is accessed from the source device 105 the covert application provider module 143 provides the covert application 141 to the source device 105, which then installs the covert application 141.

The covert application 141 interfaces with the source device 105 and registers the source device with the monitoring module 140 and thus the monitoring system by providing information about the source device to the monitoring module 140. The information about the source device 105 may include unique identification information for the source device, services available to the source device, a source device type, an address book stored on the source device, and other capabilities of the source device. For example, a set of information may include a Device Number, Make/Model of Phone, IMEI, OS Version, etc. of the source device 105. The covert application provider module 143 may use the received information to determine a best configuration for the covert application 141 provided to the source device 105 and transmit any device specific updates to the covert application 141 to perform an update. In turn, the monitoring module 140 stores the information about the source device 105 and tests the indicated capabilities of the source device 105 to determine the monitoring services available for the source device.

The monitoring module 140 also provides the information about the source device 105 to the agency 110 or agent device 109 via the interface 145 from which services available on the source device 105 and/or target contacts may be selected (or entered manually) for monitoring communications. When a service and/or target is selected for monitoring, the monitoring module 140 may transmit information about the selected service and/or targets to the covert application 141.

In some embodiments, the monitoring module 140 retrieves a voicemail recording for a virtual number. For example, the monitoring module 140 instructs the provider 127 to spoof the source's number while making a call to the source device (e.g., prior to transmitting a call forwarding command) to arrive at the mailbox of the source device. The monitoring module 140 instructs the provider 127 to record call audio to the voicemail box up to the beep or other stop indication to obtain the source's voicemail greeting. In turn, the monitoring module 140 may instruct the provider to configure the voicemail for a virtual number to playback the recorded greeting such that the voicemail greeting associated with voicemail box of the virtual number and the transmitting number of the source device match.

As described above, in some embodiments, the agency service 115 includes a monitoring interface 145 for providing recorded communications and other data collected, either on the virtual number or received from the source device 105 such as via VOIP or data uplink to various agent devices 109 and/or appliances 150 associated with the agency 110 over the network 120. For example, the interface 145 may provide data corresponding to the status (e.g., connected or disconnected) of one or more source devices 105, services monitored (or available to monitor) and any specific target devices 107 for services that are being monitored. If the covert application 141 or source device 105 is transmitting real-time data or connected to a virtual number, the interface 145 can stream data such as audio from the active transmission, GPS coordinates with heading, speed and coordinates of last-reported locations for placement on a map. In some embodiments, the interface 145 syncs collected data prior to transmission or includes tags in the transmitted data for synchronization of their playback. The monitoring interface 145 may stream data for monitored services live to agent devices 109, for example, a web interface may provide the option to listen in live to an active VOIP session associated with a source device 105 and/or to live audio on a virtual number associated with a source device. In the case of a virtual number, the agency service 115 may instruct the provider to dial in one or more agent devices 109 to listen to live audio in response to establishing (or setting up) communications between the source device and a target device.

In some embodiments, the agency service 115 includes an endpoint 147 with VOIP and session initiation protocol (SIP) capabilities for establishing VOIP sessions. For example, the endpoint 147 may receive SIP messages from the covert application 141 for setting up a VOIP session parallel to a telephony communication channel established between the source device 105 and the target device 107 without a virtual number. In some embodiments, an endpoint 147 is located remotely from the agency service 115 such as within the country the source device 105 is being operated. In such cases, the remote endpoint 147 is connected to the network 120 and transmits VOIP session audio data received from the source device 105 to the agency service 115. The VOIP endpoint 147 may generate audio recordings from received audio for playback via the interface or via an agent device 109 connecting to the VOIP endpoint to receive audio.

In one embodiment, the agency 110 includes an appliance 150 for storing data such as audio data and messages collected at the source device 105 or a virtual number the source device 105 is associated with for communicating with the target device 107. The appliance 150 may utilize the monitoring interface 145 provided by the agency service 115 for updating stored data or receive data directly from source device 105. Additionally, the appliance 150 may receive audio recorded on a virtual number and associated transcripts from the provider 127 or agency service 115. One example embodiment of the appliance 150 also includes its own interface (not shown) that enables agent devices 109 to access real-time and historic data stored on the appliance for a virtual number or a source device 105. Interfaces provided by the agency service 115 or appliance 150 may also be accessible via a web browser for streaming or downloading data and include the same or similar options.

Additionally, the appliance 150 and agency service 115 may communicate to intermittently update collected data and records at defined intervals or in response to notifications to download data. During the intervals or notification periods, the agency service 115 may process the data and perform any necessary actions associated with monitoring source devices 105 until the data is transferred to the appliance 150. In some embodiments, the agency service 115 maintains a persistent connection with the appliance 150 to facilitate transfer of real-time data collected by source devices 105 operated in the field.

In one embodiment, the agency service 115 ensures that it, and the provider 127, do not possess data collected by source devices 105 or from a virtual number beyond the time needed to facilitate transfer. However, in mission critical situations, agents and other agency 110 personnel cannot rely only on the availability of the appliance 150 for storing and maintaining collected data. Consequently, if the appliance 150 is unable to take possession of the collected data or go offline during transfer, the agency service 115 and/or the provider 127 may maintain possession of the collected data until the appliance 150 is functioning. Furthermore, the agency service 115 and/or provider 127 may determine whether checksums, hashes or sizes of transferred data match the appliance's 150 version prior to deleting stored data.

In some embodiments, the agency service 115 maintains an appliance instead of, or in addition to, the agency 110. In such cases, the appliance may exist as a dedicated piece of hardware or remote storage. Alternatively, embodiments of the appliance 150 may be implemented in a cloud computing and storage stack available on the network 120.

Example Covert Application

Figure 2:
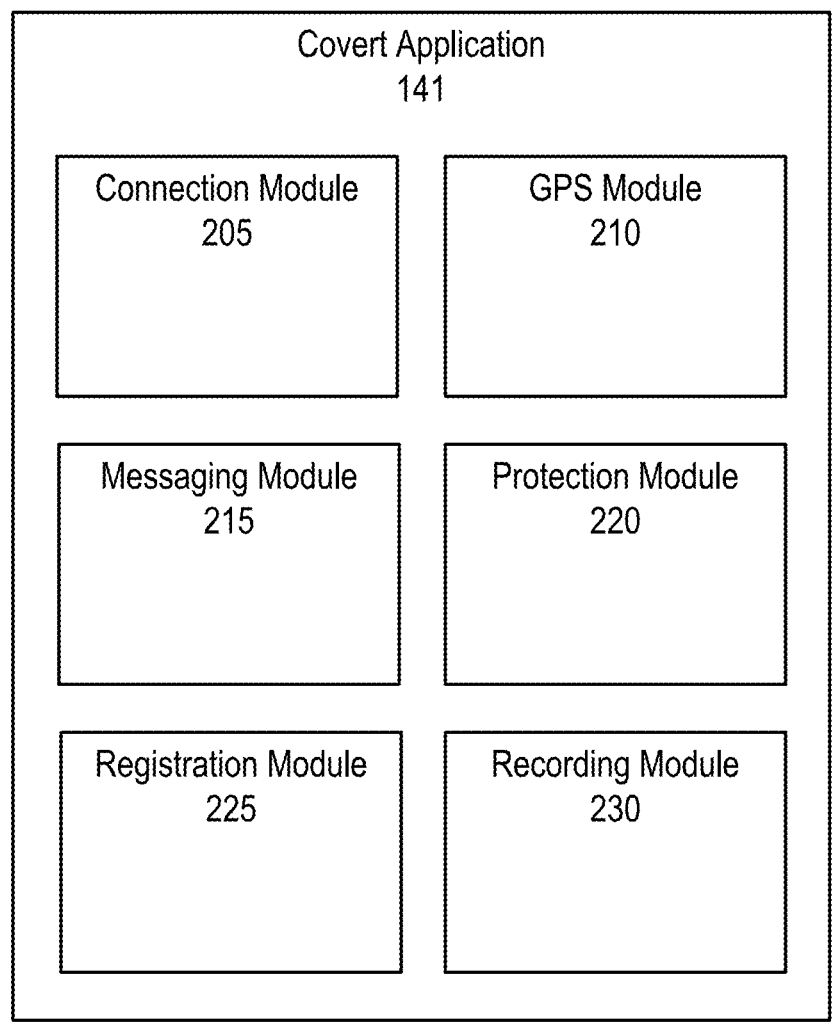
FIG. 2 is a block diagram illustrating example modules of a covert application for on device monitoring according to one example embodiment.

FIG. 2 is a block diagram illustrating example modules of a covert application 141 for on device monitoring according to one example embodiment. The covert application 141 may be downloaded from the agency service 115 to the source device 105 and executed by the source device to facilitate covert on device monitoring and transmit data to entities on the network 120. In other instances the covert application 141 may be installed directly to the source device 105. As shown in FIG. 2, the covert application 141 itself includes multiple modules. In the embodiment shown in FIG. 2, the covert application 141 includes a connection module 205, GPS module 210, messaging module 215, protection module 220, registration module module 225, and recording module 230. In some embodiments, the functions are distributed among the modules in a different manner than described herein. Other embodiments have fewer, additional and/or other modules (e.g., based on the device capabilities).

Registration

The registration module 235 interfaces with the agency service 115 to register the source device 105 with the monitoring system. The registration module 235 may execute upon installation of the covert application 141 and/or upon launch of the covert application 141 after installation. The registration module 235 transmits to the agency service 115 detected device information, such as, Device Number, Service Provider, Country, Make/Model of Phone, IMEI, OS Version, etc. IMEI or International Mobile Equipment Identity is a unique number given to every single mobile phone, typically found behind the battery. IMEI numbers of cellular phones connected to a cellular network are stored in a database (EIR—Equipment Identity Register) containing all valid mobile phone equipment. The number consists of four groups that may be formatted: nnnnnn--nn-nnnnnn-n. The first set of numbers is the type approval code (TAC). The first two digits represent the country code. The rest make up the final assembly code. The second group of numbers identifies the manufacturer. The third set is the serial number and the last single digit is an additional number (usually 0). In some embodiments, the registration module 235 receives any source device specific updates or features from the agency service 115 based on the provided information and performs an update of the covert application 141 to enable device specific monitoring features.

If the source device 105 is registered to utilize a virtual number for monitoring, the agency service 115 may additionally transmit back a virtual number assigned to the source device 105. In turn, the registration module 235 stores the virtual number for use at the connection module 205 to facilitate connections with the virtual number. If the source device 105 should utilize a parallel VOIP connection for monitoring, the agency service 115 may additionally transmit back information (e.g., an address) for a VOIP endpoint assigned to the source device 105. In turn, the registration module 235 stores the VOIP endpoint information for use at the connection module 205 to facilitate connections with the VOIP endpoint.

Further, in some instances, the agency service 115 may communicate with the registration module 235 remotely to activate/deactivate specific modules, add new modules (such as GPS tracking function), change the virtual number, or modify other configuration aspects. Hence, after registration, the protection module 220 may be executed to ensure that the function and execution of the covert application 141 to intercept communications on the source device 105 is hidden from any user.

In some embodiments, the registration module 225 receives and stores configuration information received from the agency service 115 for the virtual number, VOIP endpoint, services to monitor, and any associated target devices 107 to determine whether to intercept a particular communication or service. The registration module 235 may further receive updates to the configuration information as changes are made at the agency service 115. For example, the agency service 115 may transmit instructions to the registration module 225 specifying that only certain communication types and/or certain identified targets by their corresponding entry in the address book or transmitting numbers (e.g., of the target device) should be monitored. The covert application 141 in conjunction with the agency service 115 may ignore communications between the source device 105 and non-specified communication types and/or parties.

The registration module 225 may additionally pair the source device 105 with the agency service 115 to test features or modules of the covert application 141. For example, the registration module 225 may provide information to the agency device 115 about the active services (e.g., call, call log, message, and/or data) available to the source device 105.

In some embodiments, the registration module 225 tests paired source device 105 capabilities with the agency service 115 to ensure that intercepted communications are routed via a virtual number. For example, the registration module 225 may receive a call forwarding command for transmission to the provider of the source device and transmit the command. The call forwarding command instructs the provider to route incoming calls to the source device to the virtual number. Depending on the capabilities of the provider, the call forwarding command may blanket forward all incoming calls to the virtual number or enable the forwarding of incoming calls from a specific target device. In the latter case, the registration module 225 may transmit a call forwarding command with the transmitting numbers of one or more target devices to the provider. In some embodiments, the agency service and/or provider may initiate a test connection to the source device to determine whether the test call is forwarded to the virtual number. In turn, the registration module 225 may receive an instruction from the agency service 115 to also initiate a test connection to the virtual number to determine whether the covert application 141 and call forwarding are configured. If call forwarding does not work, the source device 105 receives the test connection. The registration module 225 detects whether the source device 105 receives the test connection and instructs the connection module 205 to terminate the test connection.

The registration module 225 subsequently reports the receipt of the test connection to the agency service 115 to indicate that configuration failed. The registration module 225 may also instruct the protection module 220 to suppress any indication on the source device 105 associated with the test such as by suppressing indication that the source device 105 connected to the virtual number or received the test connection.

In some embodiments, the registration module 225 tests the source device capabilities with the agency service 105 to ensure that intercepted communications are routed to the agency service 115 via a parallel VOIP connection. For example, the registration module 225 may transmit VOIP endpoint information for opening a parallel connection. In some embodiments, the agency service and/or provider may initiate a test connection to the source device to determine whether the test call is intercepted and a parallel VOIP connection transmitting audio from the test call is established with the VOIP endpoint. The registration module 225 detects the incoming test connection and instructs the connection module 205 to accept the incoming connection request and open the parallel VOIP connection with the VOIP endpoint (e.g., by sending one or more SIP messages to the VOIP endpoint to establish the VOIP session). The connection module 205 collects audio from the test connection and transmits it over the VOIP connection. Additionally, the recording module 230 may record collected audio from the test connection (e.g., for 10 seconds). The registration module 225 then instructs the connection module 205 to terminate the test connection and the VOIP connection and instructs the recording module 230 to upload the recoded audio to the agency service 115. In turn, the agency service 115 verifies receipt of audio at the VOIP endpoint and from the recording module 230 to determine whether configuration of the source device 105 was successful and reports success to the registration module 225. The registration module 225 may also instruct the protection module 220 to suppress any indication on the source device 105 associated with the test such as by suppressing indication that the source device 105 received the test connection, recorded call audio, and established a connection to the VOIP endpoint.

In some embodiments, the registration module 225 tests the source device capabilities with the agency service 105 to ensure that call logs are intercepted on the source device. For example, the registration module 225 may receive a request to monitor logged communications to/from the source device 105 separate from intercepting communication. The registration module 225 instructs the protection module 230 to write a test call log entry to the source device and detects the presence of a new call log. The registration module 225 reads the information in the test call log and transmits the information to the agency service 115 to verify that the call log can be read. The registration module 225 then instructs the protection module 230 to scrub the test call log entry from the call log.

In some embodiments, the registration module 225 visually indicates through the covert application 141 on the source device whether registration (e.g., test successful) of monitored services with the agency service 115 was successful. For example, the registration module 225 may visually alter an appearance of the covert application 141 (e.g., by changing a color of an icon for the covert application) on the source device to indicate success.

In some embodiments, the agency service 115 may transmit instructions to the registration module 225 to disable covert application 141 functions or uninstall itself from the source device 105. Hence, when an agency no longer needs to monitor the source device 105, monitoring functionality on the source device 105 may be disabled remotely. In some instances, the registration module 225 may initiate a timer corresponding to the duration for which a service or target should be monitored. When the timer expires, the registration module 225 may automatically unregister the source device 105 causing the covert application 141 to deactivate and optionally uninstall itself from the device.

Connections

The connection module 205 automates the intercepting of conversions on the source device 105 utilizing either a virtual number or parallel VOIP connection. The connection module 205 detects communication attempts to and/or from the source device 105 and user selections associated therewith to manage communications with target devices. If the source device 205 detects use of a service or communication attempt to a non-target device, the communications may not be intercepted. For example, the connection module 205 may not establish a parallel VOIP connection or route a connection through the virtual number. In other instances, the connection module 205 may still intercept communications associated with a non-target device and route a connection through the virtual number; however, the agency service 115 may not instruct a provider 127 to make a recording, notify and/or connect an agent device to the virtual number, or otherwise enable monitoring of those communications.

Additionally, the connection module 205 may provide information about communications to/from and attempts thereof on the source device to the agency service 115 separate from intercepting conversations on the source device. For example, once the registration module 225 verifies access to the call log, the connection module 205 may detect new call log entries and transmit information about the entries including data/time of the entry and the parties to the agency service 115.

Virtual Number Connections

In the case of intercepting conversations on the source device with a virtual number, the connection module 205 may covertly establish a connection with the virtual number to facilitate incoming and outgoing telephonic communications and monitoring thereof. The connection module 205 detects an outbound connection request on the source device to the target device and terminates them for replacement with connections through a virtual number. The connection module 205 may identify the target device specifically based on configuration information including transmitting numbers or address book entries for specific target devices to monitor or instructions to intercept all telephonic communications. Outbound connection requests not associated with a target device or monitored service may be allowed to proceed as normal. In some embodiments, information about the connection request not associated with a target device may still be transmitted to the agency service 115 for logging communications.

The connection module 205 transmits outbound request information, including target device information associated with intercepted outbound connection request, to the agency service 115 prior to and/or as the connection module 205 initiates a connection request to the virtual number to replace the outbound connection request to the target device. The outbound request information instructs the agency service 115 to prepare for an incoming call from the source device 105 to the virtual number with an intention to reach the target device indicated in the outbound request. Once the outbound request is processed, the agency service 115 may send a ready ACK to the connection module 205 to acknowledge the outbound request and readiness of the assigned virtual number. The connection module 205 may initiate the connection request to the assigned virtual number based on virtual number information stored locally or receive a virtual number to initiate a connection request to in the ready ACK received from the agency service 115.

In one embodiment, the connection module 205 waits for the ready ACK response prior to initiating a connection request to the virtual number. In other embodiments, such as if the connection module 205 has stored the assigned virtual number locally, the connection module 205 may not wait for the ready ACK. In either instance, the source device 105 requests to connect to the virtual number and a connection with the virtual number is established. The agency service 115 identifies the source device 105 and assigned virtual number via the mapping table and instructs the provider 127 to connect the source device 105 to the virtual number, configure the virtual number to spoof the number information of the source device 105, and to initiate a connection request to the target device from the virtual number with the spoofed number information such that the connection request appears to originate from the source device.

For inbound connection requests from a target device, the provider has been instructed to forward inbound connection requests to the virtual number. Instead of receiving a connection request from the target device at the source device, the connection module 205 device receives a notification that an incoming connection request from the target device routed through the virtual number is pending. The notification includes information about the target device which the connection module 205 provides to the protection module 220. The protection module utilizes the received information about the target device to mimic an incoming connection request at the source device such that it appears to originate from the target device. The notification may also include information about the virtual number for the connection module 205 to initiate a connection request to in order to establish communications between the source device and the target device. Alternatively, the connection module 205 may store information about the virtual number to use locally (e.g., from a registration with the agency service). As would be the case with a connection request coming from the target device directly, mimicking the incoming connection request from the target device causes the source device displays options for acting on the mimicked connection request from the target device. Example selections of options may include acceptance of the mimicked connection request, silence of the mimicked connection request, rejection of the mimicked connection request, and no selection at all.

The connection module 205 detects a selection and sends a selection ACK describing the selection to the agency service. Additionally, the connection module 205 provides the selection to the protection module 220 which mimics the corresponding operation on the source device. In the case of a selection to accept the mimicked connection request from the target device, the connection module 205 initiates a connection request to the virtual number to establish communications between the source device and the target device.

During and/or in response to completion of intercepting an outbound or inbound communication routed through the virtual number, the connection module 205 may forward information about the communication such as a duration and/or target device information to the protection module 220 for modifying call history on the source device 105.

VOIP Connections

In the case of intercepting conversations on the source device without using a virtual number, the connection module 205 may covertly establish a VOIP communication channel with a VOIP endpoint in parallel to a telephonic communication channel established between the source device and the target device to facilitate monitoring thereof. The connection module 205 detects outbound and inbound connection requests between the source device and a target device and determines whether to intercept the communications between the source device and the target device. For example, the connection module 205 may identify the target device specifically based on configuration information including transmitting numbers or address book entries for specific target devices to monitor or instructions to intercept all telephonic communications.

If communications with the target device should be intercepted, the connection module 205 instructs the recording module 230 to begin recording audio from the connection between the source device and the target device. The connection module 205 opens a parallel VOIP connection with a VOIP endpoint such as the agency service. The connection module 205 may determine the VOIP endpoint from the local database (e.g., from a registration with the agency service). In one embodiment, the connection module 205 requests recorded audio from the recording module 230 once the VOIP connection is established and transmits the recorded over the VOIP connection. In another embodiment, the connection module 205 accesses line audio from the call and transmits the audio over the VIOP connection to the endpoint. The connection module 205 detects termination of the communications between the source device and the target device and instructs the recording module to stop the recording. Additionally, when the connection module 205 detects the source device has access to a WiFi or other high-speed connection (e.g., 4G LTE), it may establish a connection with the agency service 115 to upload any high-quality versions of communications recordings stored at the recording module 230 (as the recording module may downsample recorded audio provided to the connection module 205 for transmission over VOIP connections).

Message Communications

The messaging module 215 monitors the source device 105 and identifies instances of new inbound or outbound messages on the source device to/from target devices. In one embodiment, the messaging module 215 transmits identified messages to the agency service 115 including source and target (e.g., transmitting numbers or address book entry), date/time, message contents, and/or GPS location corresponding to receipt/transmission of the message.

The messaging module 215 may package the message contents and information about the message such as send/receive times, the source device, the target device, and a location of the source device and transmits the package to the agency service 115. In some embodiments, the package is encrypted prior to transmission to the agency service 115.

Recording

The recording module 230 may locally record and store communications between the source device and target device. Thus, if a Virtual Number is not used to monitor communications, the recording module 230 may receive instructions to record communications on the source device. The recording module 230 may also receive requests from the connection module 205 to stream recorded audio associated with communications that are in progress over a VOIP connection. The recording module 230 stores completed recordings of the call audio which may be transmitted to the agency service 115 (e.g., cloud, server, or on-site storage appliance) along with the call metadata along with it (to, from, duration, IMEI, location at time of call, contact name called per address book, etc.) when requested by the communication module 205.

GPS Data

The GPS module 210 monitors source device 105 location (e.g., as determined through GPS and/or WiFi location identification on the device) associated with intercepted communications. The GPS module 210 may append GPS data to transmissions from the covert application 141 (and/or transmit GPS data separately with identification information for the source device and the associated communication) to the agency service 115 to indicate current location of the source device when the source device communicates with a target device.

Protection Module

The protection module 220 is executed to ensure that the function and operations of the covert application 141 on the source device 105 are hidden from any user. The protection module 220 reads the phone configuration settings and ensures that functions of the other modules and itself are not visible to the user on the device. For example, the protection module 220 may perform clean-up operations for the other modules should they need to temporarily store or transmit data. The protection module 220 further modifies or creates user visible call history entries associated with communications on the source device. For example, when the connection module 205 connects to a virtual number, the protection module 220 may modify the call history to reflect whether inbound or outbound communications occurred (or were attempted with) a target device and not the virtual number.

Additionally, the protection module 220 may interface with the source device 105 to display, suppress, modify or otherwise control native display dialogs to mimic normal operation of the source device when intercepting communications. In a specific example, in embodiments where the connection module 205 initiates a connection to the virtual number to perform an outbound call after the connection module terminates the outbound request to the target device, the protection module 220 may display the default dialing screen along with the target device information as would normally be displayed to make an observer believe that the source device is proceeding with the connection process. In turn, when the connection module 205 detects connection to the virtual number, the protection module 220 may receive a notification of the connection and display a default connected call screen for the duration of the call.

In another specific example, the protection module 220 may receive device information (e.g., of a target device) and instructions from the connection module 205 to display an incoming call screen subsequent to receiving a notification from the agency service 115 that there is an incoming connection request on a virtual number (e.g., from a target device). In turn, the protection module 220 is configured to display the incoming call screen with device information for the target device such that it appears the source device 105 has received an incoming call request from the target device. In turn, when the connection module 205 detects a user selection within the incoming call screen, the protection module 220 may receive a notification of the selection and display a default screen associated with the selection. For example, in response to a notification of a selection to accept the call, the protection module 220 may display a default connection call screen for the duration of the call.

The protection module 220 may also create an entry in the call history to reflect the incoming call request from the target device. In turn, should the protection module 220 receive indication of the connection request being accepted, the protection module 220 is configured to display an in progress call screen and additionally suppress any indication that the connection module 205 initiated a connection to the virtual number. During and/or after completion of the communications via the virtual number, the protection module 220 may update the entry it created to reflect call details associated with the connection to the virtual number such as call duration.

In another specific example, the protection module 220 may modify the source device 105 status bar to hide the GPS/location indicator that may appear automatically when the GPS location information is collected, as well as the call forwarding indicator when calls are forwarded to the virtual number.

Virtual Number Provisioning

Figure 3A:
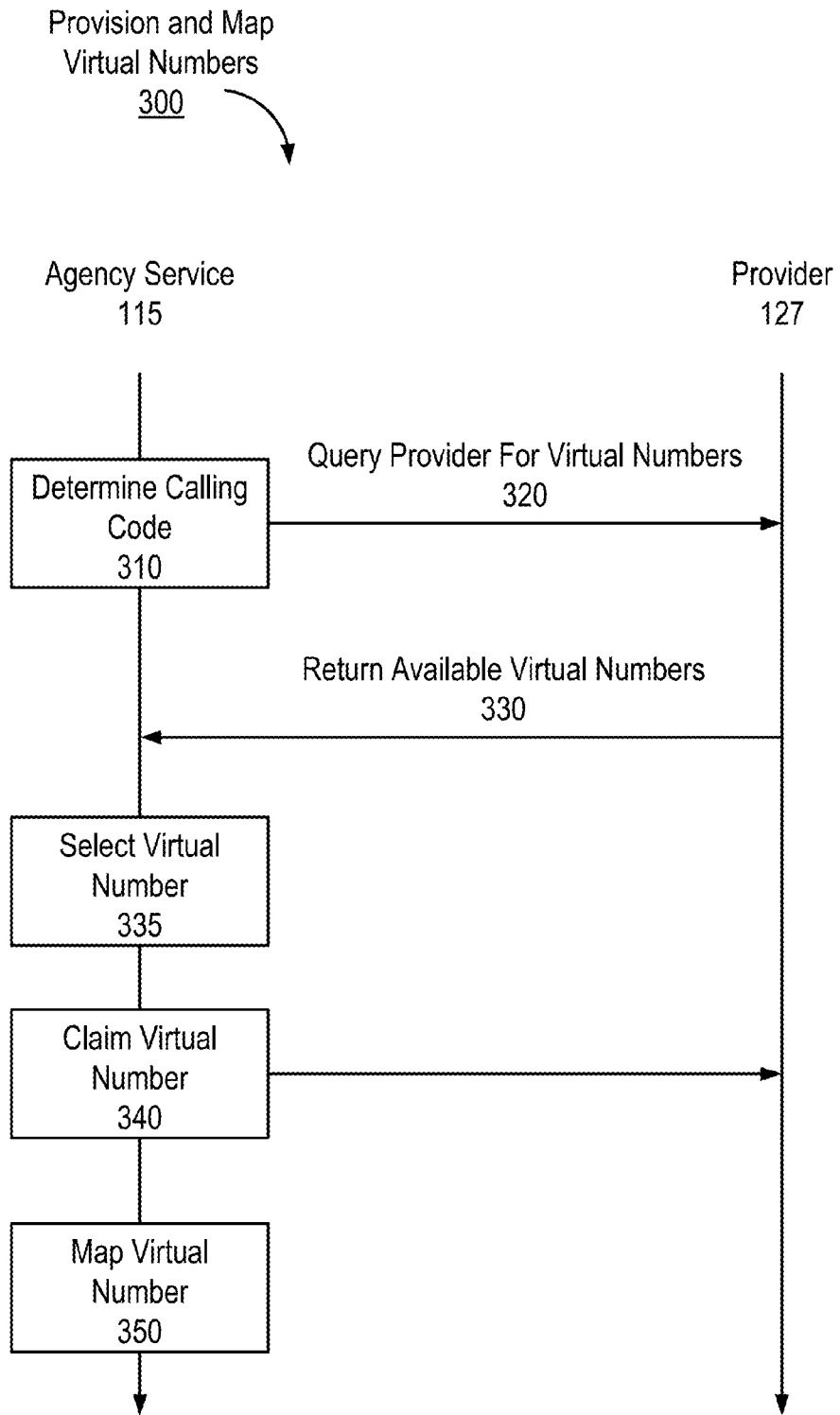
FIG. 3A is an interaction diagram illustrating a method for provisioning and mapping virtual numbers for a source device according to an example embodiment.

FIG. 3A is an interaction diagram illustrating a method for provisioning and mapping virtual numbers 300 for a source device according to an example embodiment. Initially, the agency service 115 determines whether the source device is capable of communications with a virtual number. If the source device can use a virtual number, the agency service 115 determines 310 a calling code for provisioning 300 a virtual number for the source device (e.g., based on location of operation of the source device). The calling code can include an area code and country code where the provisioned virtual number will be operated. In some embodiments, a virtual number is selected from toll-free numbers (e.g., 855) since toll-free numbers unmask blocked caller IDs, which aids in better identifying devices calling into the virtual number.

The agency service 115 queries 320 the provider for virtual numbers matching the specified calling code. The provider 127 returns 330 a list of available virtual numbers to the agency service 115 which, in turn, selects 335 a virtual number from the list and claims 340 the selected virtual number from the provider 127.

With one or more virtual numbers claimed, the agency service 115 maps 350 the virtual number to the source device transmitting number (or other identifier) and may further receive mapping requests (e.g., from the agency 110 or agent 109 via the interface 145) to associate target device transmitting numbers (or other identifiers) of target devices for which communications with the source device should be monitored with the virtual number/source device. The agency service 115 stores the transmitting numbers and the virtual number in a mapping table (e.g., at the agency service 115 or on the appliance 150). The mapping may be modified at any time, without any interruption of service.

The agency service 115 may optionally include modified number information for a claimed virtual number. For example, the agency service 115 may optionally include number information such as ANI, IMEI (International Mobile Equipment Identity) and caller identification information for a virtual number. In one embodiment, the agency service 115 receives all or a portion of this information from the source device 105 when the covert application 141 registers with the agency service 115 (with which the agency service 115 may instruct the provider 127 to user for the virtual number to spoof outgoing calls to a target device).

Additionally, the agency service 115 may optionally include a ring tone specified for playback when a device requests to connect to the virtual number. The agency service 115 subsequently stores the modified virtual number information and instructs the provider 127 to update the associated virtual number information to configure the virtual number for use with the source device 105.

Example embodiments of agent device 109 mapping to virtual numbers can be performed in the same or similar fashion. Agent device 109 mapping to virtual numbers may be used to authorize the agent device 109 to listen in on call audio between the source device and target device on the virtual number. Additionally, the mapping may be used to automatically notify the agent device 109 when the virtual number is utilized to established communications between the source device 105 and a target device 107.

FIG. 3B is a table illustrating an example embodiment of virtual number mapping 350A for source devices. As shown, mapping table 360A includes a number of Virtual numbers 363 each mapped to a corresponding transmitting number 361A (e.g., of source device 105). When the agency service 115 receives information about connection requests to a virtual number 363 from the network 120 (e.g., from the provider 127 in response to a target device 107 forwarded to the virtual number associated with a source device 105), the agency service identifies the source device associated with the virtual number and notifies the covert application 141 on the source device of the connection request on the virtual number. In turn, should the source choose to accept the connection request on the covert application 141, the covert application 141 causes the source device to request to connect to the corresponding virtual number. Again, from the mapping table 360A, the agency service 115 may identify the connection request as that of the corresponding source device for establishing communications with the target device and instruct the provider to connect the source device 105 with the target device 107 through the virtual number.

Alternatively, the agency service 115 may receive information from the covert application 141 on the source device 105 about a target device 107 the source device desires to communicate with. From the mapping table 360A, the agency service 115 determines the virtual number that the source device should request to connect to for communicating with the target device. In turn, the agency service 115 instructs the provider 127 to initiate a connection request to the desired target device 107 from the virtual number but such that it appears to originate from the source device 105 and not the virtual number. The agency service 115 may additionally instruct the provider 127 to connect the source device 105 with the virtual number in response to the covert application 141 initiating the connection request to the virtual number to establish communications between the target device and the source device.

FIG. 3C is a table illustrating an example embodiment of virtual number mapping 350B for target devices. As shown, mapping table 360C includes a number of Virtual numbers 363 each mapped to a corresponding transmitting number 361B (e.g., of a target device 107). When the agency service 115 receives information about connection requests to a virtual number 363 from the network 120 (e.g., from the provider 127 in response to a target device 107 forwarded to the virtual number associated with a source device 105), the agency service identifies from the mapping table whether the request device is a target device 107 associated with the virtual number. If the requesting device is a target device 107, the agency service 115 instructs the provider to record audio communications between the source device 105 and the target device 107 on the virtual number.

Similarly, when the agency service 115 receives information from the covert application 141 on the source device 105 about a device the source desires to communicate with, the agency service 115 may determine from the mapping table 360B whether the device is a target device 107 selected for monitoring and instruct the provider to record audio communications between the source device 105 and the target device 107 on the virtual number.

If all communications via the virtual number associated with a source device are to be monitored, no specific target device information may be stored in the mapping table 360B and instead an indication that all communications are to be recorded may be stored (e.g., record all).

Additionally, in some embodiments, the agency service 115 may store information about one or more agent devices 109 in association with a virtual number. In turn, when the agency service 115 identifies that the source device 105 is using the virtual number to communicate (e.g., with a target device 107 stored in the mapping table 360B) or any device, the agency service 115 may instruct the provider 127 to dial out from the virtual number or otherwise connect the agent device 109 with the virtual number such that the agent device 109 receives live audio communications between the source device and the target device. In such cases, the agency service 115 additionally instructs the provider to configure the connection established through the virtual number with the agent device 109 such that audio transmitted from the agent device or associated with connection process (e.g., any dial tones) to the virtual number is disabled.

In embodiments where the covert application 141 on a source device 105 is configured to establish a parallel VOIP connection with an endpoint, the agency service 115 may store information about target devices 107 for which communications should be intercepted in association with identification information for the source device 105. In turn, the agency service 115 may provide the mapping table to the covert application 141 such that the covert application 141 can determine whether to open a parallel VOIP connection with a VOIP endpoint based on comparing target device 107 information received at the source device 105 (e.g., in response to an incoming or outgoing connection request) with target device information stored in the mapping table.

Pairing a Source Device

Figure 4:
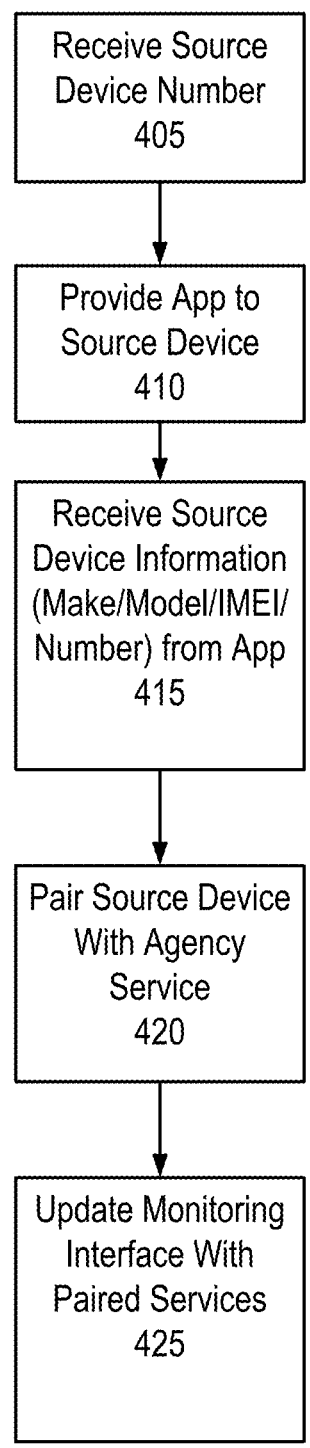
FIG. 4 is a flow diagram illustrating a method for pairing a source device with a covert on device monitoring system, according to an example embodiment.

FIG. 4 is a flow diagram illustrating a method for pairing a source device with a covert on device monitoring system, according to an example embodiment. The agency service 115 receives 405 information about a source device 105 such as the transmitting number of the source device from an agent or agency service (e.g., via interface 145). The agency service 115 provides a link to the source device 105 that may be selected on the source device to request download of the covert application 141. The agency service 115 provides 410 the covert application 141 to the source device 105. When the covert application 141 is installed to the source device 105, it collects information about the source device and transmits the information to the agency service 105.

The agency service 115 receive 415 source device information such as make, model, IMEI number, country, phone number, operating system information, provider, etc. from the covert application 141 on the source device 105 and determines source device 105 capabilities. Additionally, in some embodiments, the agency service 115 may provide any updates to the covert application 141 specific to the source device 105 based on the received 415 source device information to enable interception of communications on the source device 105.

The source device 105 capabilities are paired 420 with the agency service. In some embodiments, the paring of capabilities of the source device 105 with the agency service comprises identifying whether the source device can communicate with a virtual number on the network 120 (e.g., based on the provider for the source device and/or location of the source device), identifying whether the source device can utilize a data connection to open VOIP connections, identifying whether the source device can send/receive text messages, and/or use location based services such as GPS. The agency service 115 updates 425 the interface 145 to indicate the services available for intercepting communications on the source device 105 with the covert application 141. In some embodiments, the covert application 141 may provide address book entries to the agency service 115 for contacts stored in an address book on the source device.

Covert Monitoring with a Virtual Number

Figure 5:
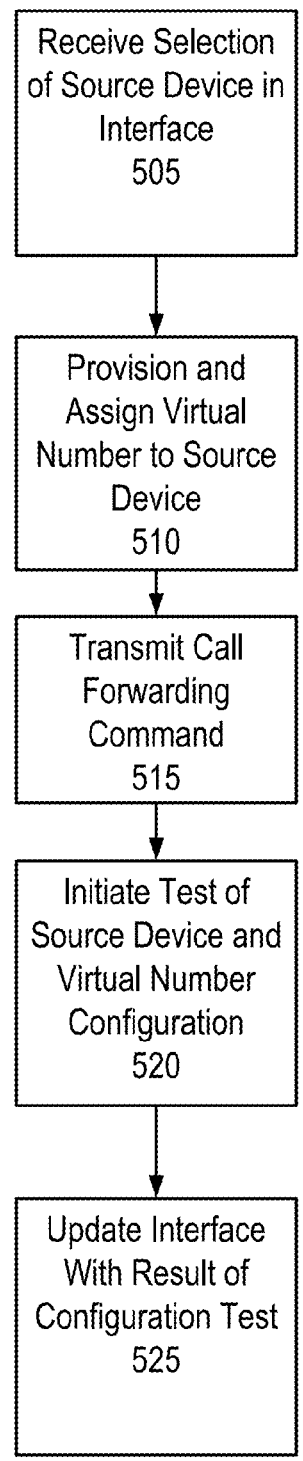
FIG. 5 is a flow diagram illustrating a method for enabling monitoring of services on a source device with a virtual number, according to an example embodiment.

FIG. 5 is a flow diagram illustrating a method for enabling monitoring of services on a source device with a virtual number, according to an example embodiment. The steps in FIG. 5 may be performed by the agency service 115 to configure a covert application 141 on a source device 105 to intercept communications using a virtual number. The agency service 115 may receive selection of a source device 105 from the interface 145 by an agency 110 or agent device 109. For example, the agent may make a selection 505 to intercept calls on the source device 105 with the covert application 141. The agency service 115 provisions and assigns 510 a virtual number to the source device 105. For example, the agency service 115 may provision the virtual number and assign the virtual number to the source device in a mapping table as described with reference to FIG. 3.

The agency service 115 transmits 515 a call forwarding command to the covert application 141 on the source device 105 along with the assigned virtual number. The call forwarding command may be selected from a listing of provider specific call forwarding commands based on the provider of the source device 105. The covert application 141 in turn, automatically (e.g., without input at the source device from the source) transmits 515 the call forwarding command to the provider to forward incoming connection requests to the source device 105 to the assigned virtual number.

The agency service 115 initiates 520 a test of the source device 105 and virtual number configuration by requesting to connect to the source device 105 with a test number to determine if the connection is forwarded to the virtual number. If the connection request is forwarded to the virtual number, the agency service 115 receives information about the connection request from the test number from the provider 127 with which the virtual number was provisioned. The agency service 115, in turn, may instruct the covert application 141 on the source device 105 to request to connect to the virtual number and receive information about the source device's 105 request to connect to the virtual number from the provider 127. By instructing the provider 127 to establish a connection between the test number and the source device 105 on the virtual number and generate a recording, the agency service 115 verifies configuration of the covert application 141, call forwarding, and virtual number.

If forwarding of the test connection to the virtual number fails, the covert application 141 on the source device 105 detects the presence of the incoming connection request from the test number and notifies the agency service 115 that it received the test connection to indicate failure of the call forwarding configuration.

The agency service 115 updates 525 the interface 145 with the result of the configuration test to indicate to the agency 110 or agent device 109 whether communications on the source device 105 are being intercepted.

Additionally, within the interface 145, the agency service 115 may provide options associated with intercepting communications on the source device 105. For example, the agency service 115 may specify an option for a Start Date/Time and Stop Date/Time to Perform Intercept to schedule transmission 515 of the call forwarding command to begin the intercept and subsequent transmission of a command to revoke call forwarding to the virtual number. Another option may include the selection of contacts from the address book of the source device 105 or manual entering of transmitting numbers for the target devices to intercept communications to/from with the source device. The transmitting numbers of the target devices and/or contacts may be stored in a mapping table at the agency service and optionally provided to the covert application on the source device.

FIGS. 6A and 6B are flow diagrams illustrating methods for covertly monitoring outbound calls on a source device with a virtual number, according to example embodiments. Referring first to FIG. 6A, which illustrates processing steps of a covert application (e.g., covert application 141) on a source device 105, the covert application 141 executing on the source device detects 605 an outbound connection request on the source device 105. To intercept the communications, the covert application 141 terminates 610 the outbound connection request such that the outbound connection request on the source device continues to appear in process. For example, the covert application 141 may cause the source device 105 to continue to display a dialing screen with information about the outbound connection request (e.g., the transmitting number and/or contact information) and play any ringing sound uninterrupted even though the outbound connection request was terminated. In another embodiment, the covert application does not play any recorded ringing on outbound calls when the source device connects to the virtual number sufficiently fast such that when the provider utilizes the virtual number to dial the target device the terminating provider for the target plays the ringing sound on the line.

In some embodiments, the covert application 141 checks to see if the outbound connection request is to a target device 107 before terminating 610 the connection request based on agreement of the dialed transmitting number (or selected contact) with target device information stored in a mapping table. Outbound connection requests that are not to a target device may proceed in a traditional fashion.

The covert application 141 transmits 615 data about the attempted outbound connection request such as the number of the target device and a source device identifier to the agency service 115. In one embodiment, the covert application 141 waits to receive 620 a ready acknowledgement (ACK) from the agency service notifying the covert application 141 that a virtual number associated with the source device is ready to receive a connection request from the source device. The covert application 141 may store information about the virtual number to request the connection with locally. In other embodiments, the ready ACK may include information about the virtual number the covert application 141 should initiate the connection request with. In the background, the agency service 115 utilizes the provided information about the target device to initiate a connection request to the target device from the virtual number such that it appears to originate from the source device.

The covert application 141 initiate 625 a new (replacement) outbound connection request to the virtual number. Throughout the process, the covert application 141 maintains the display of the dialing screen uninterrupted with the original outbound connection request information. In turn, when the covert application 141 detects connection to the virtual number (and/or the target device via the virtual number), the covert application 141 causes the source device 105 to display a connected screen with the information about the outbound connection request (e.g., the transmitting number and/or contact information) instead of that for the virtual number.

The covert application 141 modifies 630 call history on the source device 105 to scrub traces of termination of the original outbound connection request and subsequent establishment of the replacement connection with the virtual number. Thus, for example, the covert application 141 modifies 630 the call history to indicate that the target number, not the virtual number was dialed and updates communication session details (e.g., a duration) for the terminated outbound connection request with those from the communication session with the virtual number.

FIG. 6B illustrates to processing steps at an agency service 115 to establish communications between a source device and target device through a virtual number. The agency service 115 receives information 655 about an outbound connection request on a source device 105 (e.g., from covert application 141 executing on the source device 105). The received information 655 includes a target number for the target device the source device desires to communicate with and identification information of the source device.

In some embodiments, the agency service 115 determines 660 whether the communications between the source device and the target device should be intercepted for recording. For example, the agency service 115 may determine whether the information about the outbound connection request matches that of a target device stored in association with the source device and assigned virtual number for the source device in a mapping table. If the communications should not be intercepted, the agency service 115 may still proceed to connect the source device with the target device through the virtual number but without instructing a provider to record any audio information associated with the communications.

The agency service 115 determines a virtual number associated with the source device 105 by, for example, performing a look-up of received identification information for the source device in a mapping table comprising source device information associated with virtual numbers. In one embodiment, the agency service 115 transmits 665 a ready ACK to the covert application 141 indicating that the agency service 115 and/or provider 127 are ready to establish communications on the virtual number. For example, the agency service 115 may transmit the ready ACK in response to querying the provider about the status of the virtual number to ensure the virtual number is not currently in use.

The agency service 115 instructs 670 the provider to establish communications between the source device 105 and the target device 107 via the virtual number. For example, the agency service 115 may instruct the provider 127 to expect an incoming connection request (e.g., initiated by the covert application 141 in response to the ready ACK) on the virtual number associated with the source device from the source device and deny other connection request. Alternatively, the provider 127 may forward information about devices attempting to connect to the virtual number to the agency service 115 which, in turn, verifies the device as the source device based on the mapping information for the virtual number and instructs the provider to connect the source device and to deny connections from other devices.

Additionally, the agency service 115 instructs the provider 127 to initiate a connection request to the target device 107 from the virtual number with spoofed number information for the virtual number such that the connection request received at the target device 107 appears to originate from the source device 105 and not the virtual number. If the target device accepts the connection request, the source device 105 and target device 107 are connected through the virtual number to establish back and forth (bi-directional) audio communications. If the agency service 115 determined 660 that the communications are to be recorded, the agency service 115 may additionally instruct the provider 127 to record the communications on the virtual number and dial in an agent device 109 on the virtual number (e.g., based on an agent device to virtual number/source device mapping in the mapping table).

Figure 7A:
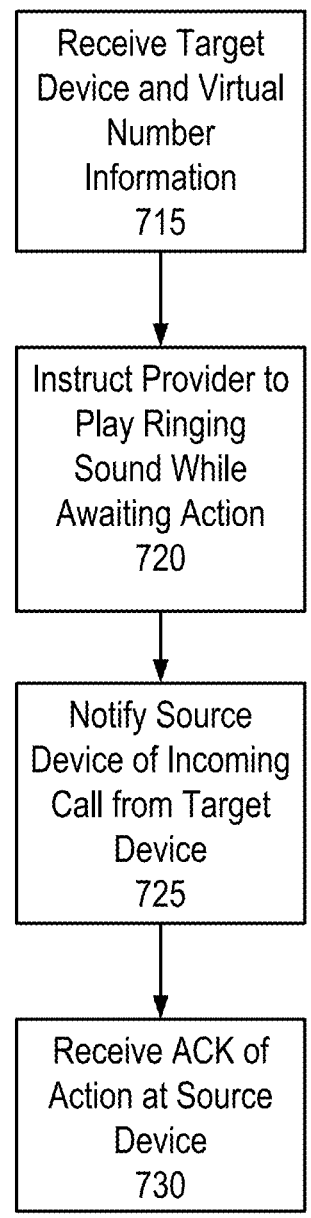
FIGS. 7A, 7B, and 7C are flow diagrams illustrating methods for covertly monitoring inbound calls on a source device with a virtual number, according to example embodiments.
Figure 7B:
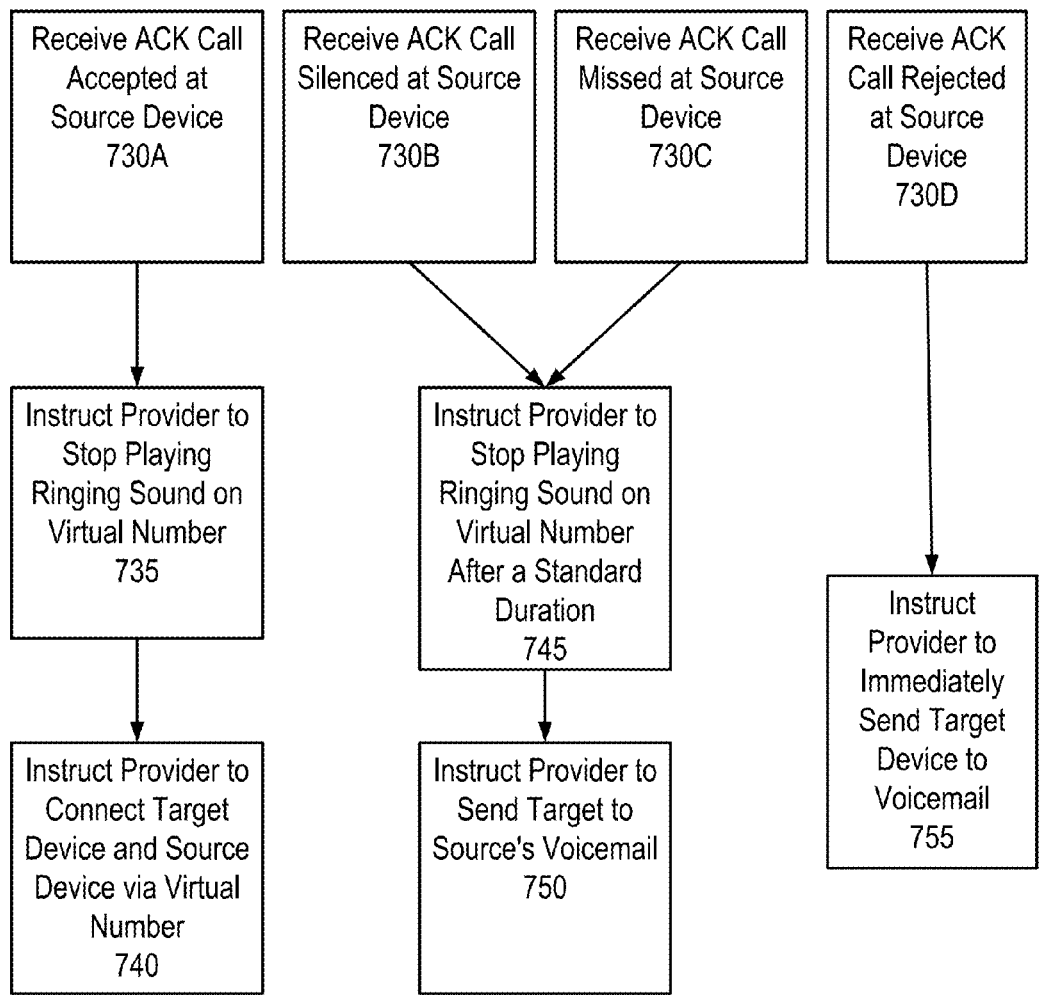
Figure 7C:
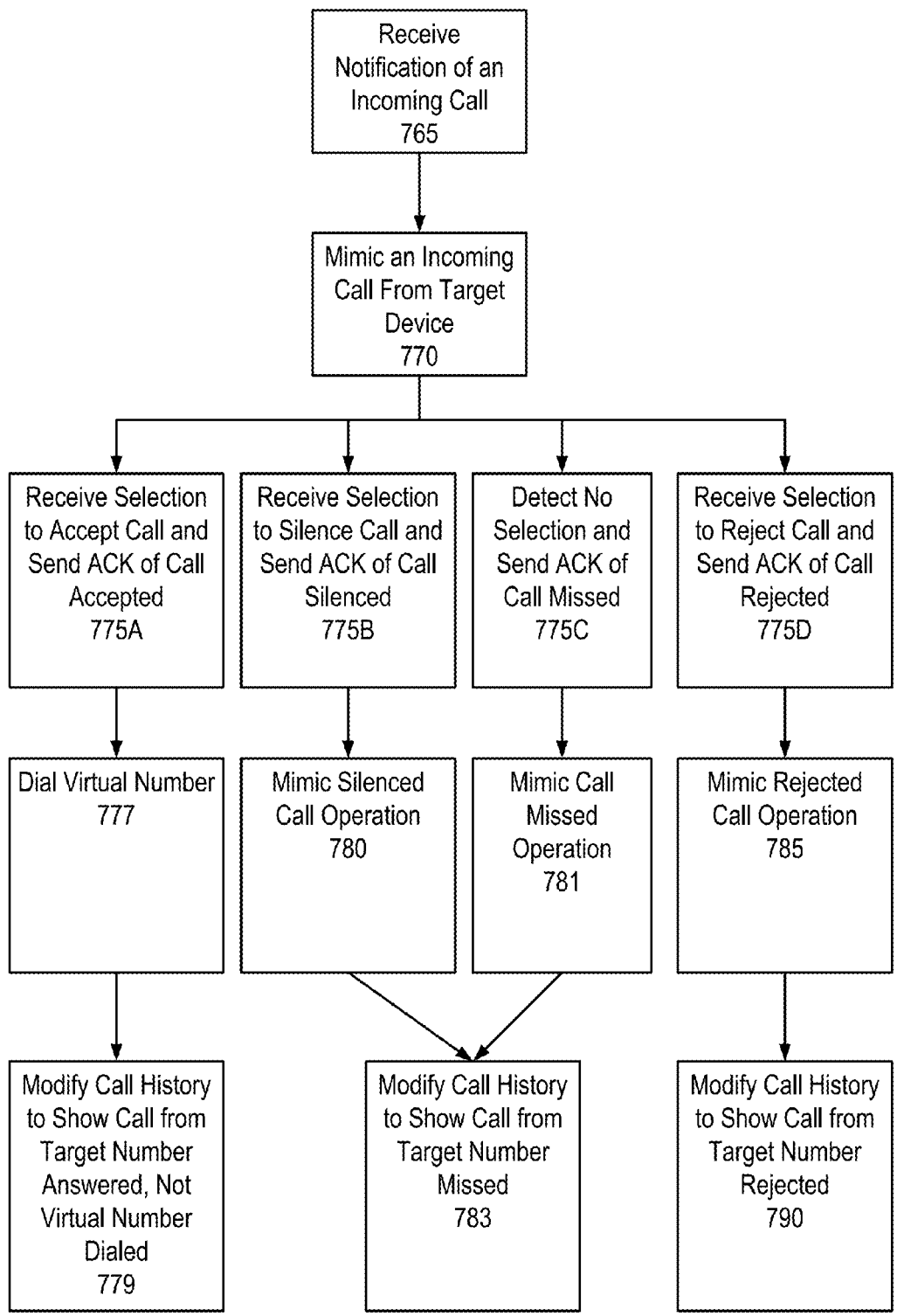

FIGS. 7A through 7C are flow diagrams illustrating methods for covertly monitoring inbound calls on a source device with a virtual number, according to example embodiments. Referring first to FIGS. 7A and 7B, FIGS. 7A and 7B illustrate processing steps at an agency service 115 to establish communications between a source device and target device though a virtual number.

In some embodiments, the agency service 115 provides instructions to a covert application (e.g., cover application 141) executing on a source device to instruct a provider to automatically forward calls to a virtual number associated with the source device. In other embodiments, the agency service 115 may instruct the provider to forward calls to the source device to the virtual number. In either instance, the provider automatically forwards inbound calls to the virtual number. When the provider receives an inbound connection request on the virtual number, it transmits information identifying the virtual number and information about the inbound connection request such as the transmitting number of the requesting device (e.g., a target device) to the agency service 115.

As shown in FIG. 7A, the agency service 115 receives 715 the information identifying the virtual number and about the inbound connection request from the target device on the virtual number. The agency service 115 instructs 720 the provider to play a ringing sound to the target device while awaiting action on the source device. In some embodiments, the agency service 115 identifies a ring tone to play to the target device and transmits the ring tone to the provider for playback to the target device. In some embodiments, the agency service 115 may additionally instruct the provider not to accept connection requests from other target devices (e.g., play a busy signal or forward to voicemail) to the virtual number and provide information about the source device associated with the virtual number from which an inbound call is expected.

The agency service 115 notifies 725 the covert application 141 executing on the source device 105 of the incoming connection request on the virtual number. The notification transmitted to the covert application 141 may include information about the inbound connection request such as the transmitting number of the requesting device and optionally, the virtual number the covert application 141 should instruct the source device to request a connection with to communicate with the target device. In one embodiment, the agency service 115 identifies the appropriate source device to notify of the incoming connection request from the target device by performing a lookup in a mapping table storing source device information in association with virtual number information.

Additionally, the agency service 115 may use the mapping table to determine whether the communications between the source device and the requesting target device should be recorded based on agreement of requesting target device information with target device information for monitoring stored in association with the virtual number or source device information in the mapping table.

The agency service 115 receives 730 an ACK from the covert application 141 on the source device 105 indicating a selection of an option for acting on the connection request taken at the source device 105 in response to the notification. The agency service 115 transmits instructions to the provider 127 based on the type of received ACK. FIG. 7B illustrates example ACK types and the steps taken by the agency service 115 to process them.

The agency service 115 may receive an ACK 730A from the covert application 141 indicating that the connection request from the target device was accepted at the source device. In response, the agency service 115 instructs the provider 127 to stop 735 playing the ringing sound on the virtual number (to the target device) and to establish 740 a connection between the target device and the source device via the virtual number. The agency service 115 may have transmitted information about the source device the provider should expect a connection request on the virtual number from in a previous step. Alternatively, the agency service 115 may receive information identifying the virtual number and the source device in response to the source device requesting to connect to the virtual number. In turn, the agency service 115 may perform a lookup of the source device and virtual number in the mapping table and instruct the provider to connect the requesting device with the virtual number based on their agreement in the mapping table (connection requests from other devices may be denied).

Additionally, if the communications are to be recorded, the agency service 115 instructs the provider to generate a recording of the communications on the virtual number for the agency service 115 and optionally instruct the provider to dial in an agent device 109 associated with the virtual number in the mapping table to listen in on the call.

The agency service 115 may receive an ACK 730B from the covert application 141 indicating that the connection request from the target device was silenced or receive an ACK 730C indicating that the connection request from the target device was missed (e.g., no selection). In response, the agency service 115 instructs 745 the provider to stop playing the ringing sound on the virtual number to the target device after a standard duration (e.g., 6, 9 or 12 seconds) and send 750 the target device to a voice mailbox. For the call silenced ACK, the agency service 115 may wait for the standard duration to receive a subsequent ACK of call accepted at the source device 730A and proceed to steps 735 and 740.

In one embodiment, the voice mailbox is set up for the virtual number and includes a default audio message with information for the source device. In other embodiments, the agency service 115 may instruct the covert application 141 to obtain a recording that is transmitted to the provider to playback to the target device. In another embodiment, the agency service 115 may retrieve the voicemail recording from the provider of the source device.

The agency service 115 may receive an ACK 730D from the covert application 141 indicating that the connection request from the target device was rejected at the source device 105. In response, the agency service 115 instructs 755 the provider to immediately stop playback of the ringing sound on the virtual number to the target device and send the target device to the voice mailbox.

If the communications between the source device and the target device were to be recorded, the agency service 115 instructs the provider to generate a recording of any voicemail left by the target on the voice mailbox for the agency service 115. The agency service 115 may additionally instruct the provider to dial in an agent device 109 associated with the virtual number in the mapping table to listen to the recorded voicemail. In other embodiments, the agency service 115 may notify the agent device and/or agent via the interface 145 of the action taken at the source device and whether a voicemail is pending for review.

Referring now FIG. 7C, FIG. 7C illustrates processing steps at a covert application (e.g., covert application 141) executing on a source device to establish communications between a source device and target device on a virtual number. In some embodiments, an agency may desire to intercept audio on a source device that is receiving a call from a target device with a virtual number. A covert application for intercepting audio on the source device with a virtual number is provided by an agency service to the source device. The covert application may instruct a provider to forward all calls to the source device to the virtual number. Thus, as described above, instead of receiving a connection request from the target device at the source device, the covert application receives a notification 765 of an incoming connection request from the target device routed through the virtual number from the agency service 115.

The received notification 765 includes information about the target device. The notification may also include information about the virtual number for the covert application to initiate a connection request to in order to establish communications between the source device and the target device should the source choose to accept the connection request from the target device. Alternatively, the covert application may store information about the virtual number to use locally.

In response to the notification, the covert application 141 mimics 770 the operations of an incoming connection request at the source device as if one originated from the target device. For example, the covert application 141 may cause the source device to display an incoming call screen populated with the information for the target device, play a ringing sound, and display options for acting on the connection request. In response to a selection of an option for acting on the connection request (or no action), the covert application 141 transmits an ACK to the agency service 115 describing the source's selection for acting on the connection request. Additionally, the ACK may include location information such as GPS coordinates of the source device. The covert application 141 may suppress any notification on the source device that a GPS location was collected.

The covert application 141 may receive a selection 775A to accept the connection request and transmit an ACK of call accepted to the agency service 115. In turn, the covert application 141 instructs the source device 105 to initiate 777 a connection request to the virtual number. The covert application 141 also causes the source device 105 to stop playback of a ring tone and display a call connected screen populated with information for the target device to mimic acceptance of the connection request instead of any indication that the virtual number was dialed to establish communications with the target device. The covert application 141 modifies 779 call history on the source device 105 to scrub any indication the virtual number was dialed and to mimic indication that a connection request was received from the target device. Additionally, the covert application 141 populates the call history entry indicating that a connection request was received from the target device with session information (e.g., call duration) associated with the connection to the virtual number.

The covert application 141 may receive a selection 775B to silence the connection request and transmit an ACK of call silenced to the agency service 115. In turn, the covert application 141 causes the source device 105 to stop playback of the ring tone and mimic 780 a silenced call operation. For example, the covert application 141 may cause the source device to continue to display the incoming call screen populated with the information for the target device for a standard duration (e.g., 6, 9, or 12 seconds) during which the covert application 141 may receive a subsequent selection to accept the connection request 775A and proceed to steps 777 and 779. After the standard duration, the covert application 141 causes the source device 105 to display any call missed screen or notification (e.g., as in step 781 as described below). The covert application 141 modifies 783 call history on the source device 105 to mimic indication that a connection request was received from the target device and missed.

The covert application 141 may receive a no selection 775C after a standard duration (e.g., 6, 9, or 12 seconds) in response to the connection request and transmit an ACK of call missed to the agency service 115. After the standard duration, the covert application 141 causes the source device 105 to stop playback of the ring tone and mimic 781 a call missed operation. For example, the covert application 141 may cause the source device to display any call missed screen or notification. The covert application 141 modifies 783 call history on the source device 105 to mimic indication that a connection request was received from the target device and missed.

The covert application 141 may receive a selection 775D to reject the connection request and transmit an ACK of call rejected to the agency service 115. In turn, the covert application 141 causes the source device 105 to stop playback of the ring tone and mimic 785 a call rejected operation. For example, the covert application 141 may cause the source device to cease display the incoming call screen populated with the information for the target device and display any call rejected screen or notification. The covert application 141 modifies 790 call history on the source device 105 to mimic indication that a connection request was received from the target device and rejected.

If the target leaves a voicemail with a voice mailbox associated with the virtual number, the covert application 141 may additionally receive a notification (e.g., from the agency service 115) indicating the presence of a new voicemail. The covert application 141 may additionally receive the voicemail from the agency service 115 and/or provider 127 for playback directly on the device. The covert application 141 populates information for the voice mail with that of the associated connection request that was missed or rejected.

In another embodiment, the covert application 141 may establish a connection with the voice mailbox associated with the virtual number to playback the voicemail. For example, the covert application 141 may detect when the source device dials "1" for voicemail or dials the source device's own number as an indication that the source desires to check his voicemail box and initiate a connection request to the virtual number. Since the caller ID for the (unexpected call due to the source device not transmitting target device information to the agency service 115) coming into the virtual number matches the source's number, the agency service 115 instructs the provider to request that the source "Enter your voicemail PIN" and to route (if the PIN is correct) the source device to the voicemail box set up for the virtual number.

Covert Monitoring with VOIP

Figure 8:
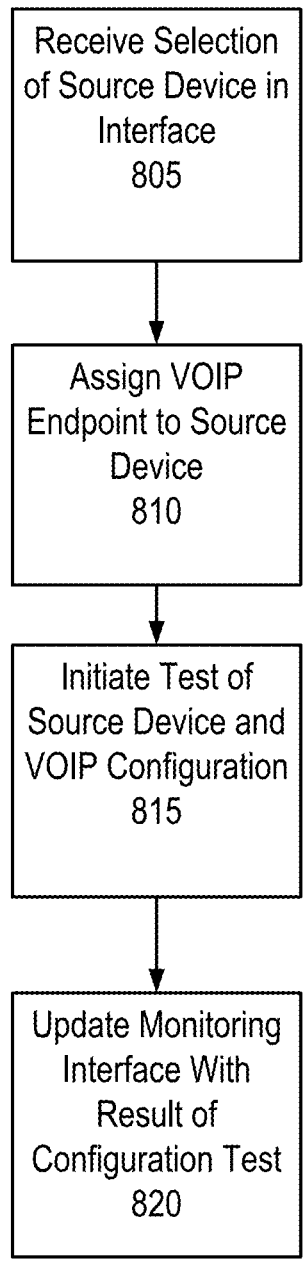
FIG. 8 is a flow diagram illustrating a method for enabling monitoring of services on a source device with Voice Over Internet Protocol (VOIP), according to an example embodiment.

FIG. 8 is a flow diagram illustrating methods for enabling monitoring of services on a source device with VOIP, according to an example embodiment. The steps in FIG. 8 may be performed by the agency service 115 to configure a covert application 141 on a source device 105 to intercept communications using a parallel VOIP connection.

The agency service 115 may receive selection 805 of a source device 105 from the interface 145 by an agency 110 or agent device 109. For example, the agent may make a selection to intercept calls on the source device 105 with the covert application 141. The agency service 115 assigns 810 a VOIP endpoint to the source device and transmits information about the VOIP endpoint to the covert application 141. For example, the agency service 115 may transmit an address of a VOIP endpoint proximate to the location of source device operation and any authorization data for connecting to the VOIP endpoint to the covert application 141.

The agency service 115 instructs the covert application 141 to open a parallel VOIP connection with a VOIP endpoint to test 815 source device connectivity to the VOIP endpoint. The agency service 115 may subsequently receive confirmation of the connection at the VOIP endpoint and a collected audio recording from the VOIP endpoint if the connection was successful. In turn, the agency service 115 updates 820 the interface (e.g., 145) with the results of the VOIP configuration test. In some embodiments, the agency service 115 receives a high-definition on-source device recording created by the covert application 141 when a high-speed connection is available to the source device. The agency service 115 may additionally update 820 the interface to confirm receipt of the high-definition recording. Alternatively, the agency service 115 may update 820 the interface to indicate failure of the test 815 in the event of a no-connection at the VOIP endpoint or no-receipt of the high-definition recording.

The agency service 115 may additionally receive information (e.g., in a mapping request) about target devices (or communications with contacts from an address book) to intercept source device and transmit the information about the target devices to the covert application 141 on the source device. In turn, the covert application 141 may determine whether an inbound/outbound connection request on the source device includes information for a target device to record and open a parallel VOIP connection based on the determination.

Figure 9:
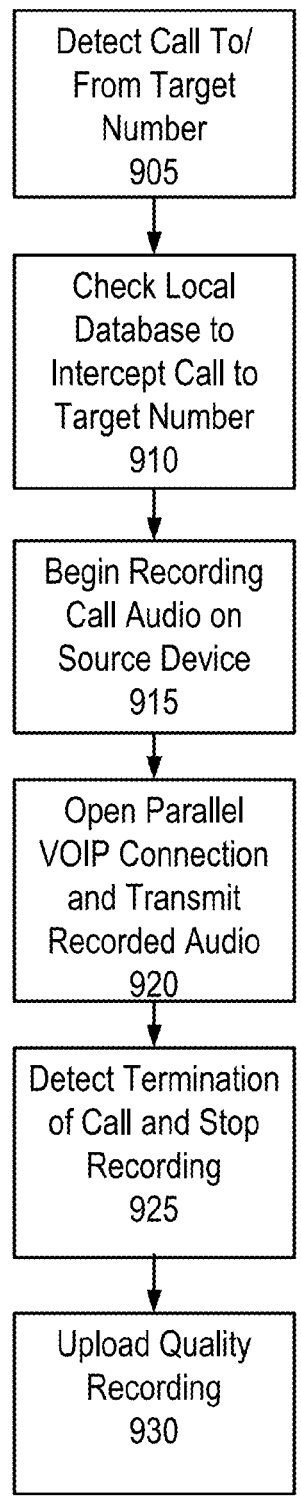
FIG. 9 is a flow diagram illustrating a method for covertly monitoring calls on a source device with VOIP, according to an example embodiment.

FIG. 9 is a flow diagram illustrating a method for covertly monitoring calls on a source device with VOIP, according to an example embodiment. The steps in FIG. 9 may be performed by a covert application 141 on a source device 105 to intercept communications using a parallel VOIP connection.

The covert application detects 905 outbound and inbound connection requests between the source device and a target device (e.g., based on the transmitting number of the target device) and determines whether to intercept the communications between the source device and the target device. For example, the covert application may check a local database 910 to determine whether communications with the target device should be intercepted. The local database includes information about target devices and/or contacts from an address book on the source device selected for monitoring. In one embodiment, the covert application 141 provides address book entries to the agency service 115 from which an agent may select via interface 145 to monitor source device communications with or manually enter information such as transmitting numbers for target devices. The covert application 141 may receive information about the agent's selections and manually entered numbers for storage in the local database. Alternatively, the covert application 141 may receive an instruction to intercept all audio communications on the source device.

If the communications with the target device should be intercepted, the covert application 141 begins recording 915 audio from the communications on the source device. The covert application 141 opens 920 a parallel VOIP connection with a VOIP endpoint such as the agency service to transmit audio (e.g., line audio from the call). The covert application may determine the VOIP endpoint from the local database (e.g., received from registration with the agency service).

The covert application detects termination 925 of the communications between the source device and the target device and stops the recording. As there can be a delay between transmissions to the VOIP endpoint and communications between the target device and the source device, the covert application may hold the VOIP connection open to complete transmission of line audio (or in other embodiments, recorded audio) prior to terminating the VOIP connection.

Additionally, the covert application 141 detects when the source device has access to a WiFi or other high-speed connection (e.g., 4G LTE) and uploads 930 a high-quality version of the recording to the agency service 115 as the covert application may downsample VOIP recording transmissions based on the capabilities of the wireless network available at the time of the communications between the source device and the target device. The covert application may additionally append the recording with GPS location information about when the call took place and the parties participating in the communication.

The covert application 141 suppresses any visual notifications associated with establishing the VOIP connection, GPS location determination, and/or uploading the high-quality audio recording to the agency service 115.

Covert SMS Monitoring

Figure 10:
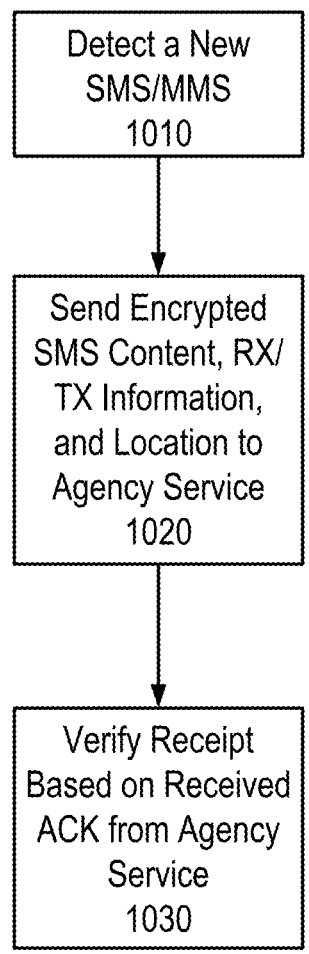
FIG. 10 is a flow diagram illustrating a method for covertly monitoring SMS communications on a source device, according to an example embodiment.

FIG. 10 is a flow diagram illustrating a method for covertly monitoring SMS communications on a source device according, to an example embodiment. The steps in FIG. 10 may be performed by a covert application 141 on a source device 105 to intercept message communications such as SMS, MMS and other message communications described herein.

The covert application 141 monitors the source device 105 to detect 1010 instances of new inbound or outbound messages on the source device to/from target devices. For example, the covert application may compare sender and intended recipient information of a detected message with target device information stored in a local database (e.g., received from the agency service 115 based on target device—source device mapping) to determine whether to provide the message to the agency service 115. Alternatively, the covert application may receive an instruction to provide all detected inbound/outbound messages to the agency service.

The covert application 141 may package and encrypt the message contents and information about the message such as send/receive times, the source device, the target device, and a location of the source device. The covert application 141 transmits 1020 the package to the agency service 115. The agency service 115 processes the message contents and transmits and ACK of receipt to the covert application 141. For example, the agency service 115 may hash the received package and transmit the hash to the covert application 141 in the ACK. The covert application 141, in turn, verifies 1030 receipt of the message contents from the agency service 115 in response to the ACK. For example, the covert application 141 may hash the package and compare a received hash in the ACK with the hash of the package. In other embodiment, the covert application 141 may transmit a hash with the package that the agency service 115 compares to a hash generated for the received contents.

Example GUIs

Figure 11:
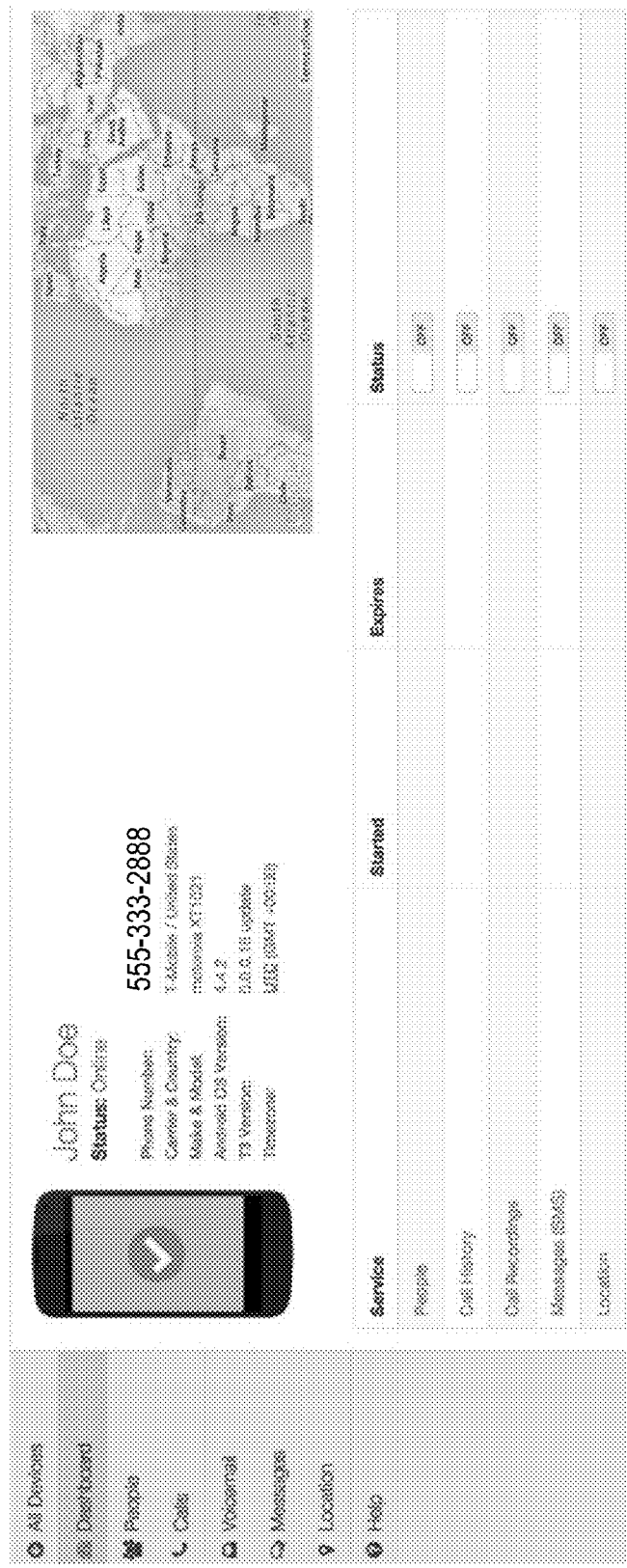
FIG. 11 is a graphical user interface illustrating monitoring selections for a source device, according to an example embodiment.

FIG. 11 is a graphical user interface illustrating monitoring selections for a source device, according to an example embodiment. In some embodiments, the GUI is accessible over a network via the interface 145 of the agency service 115 and/or appliance 150 of the agency 110. In other embodiments, the GUI may be generated by a stand alone application at the agency 110 or agent device 109 and populated with information provided by the interface 145 and/or the appliance 150. As shown in FIG. 11, a number of paired monitoring services such as people (address book retrieval), call history, call recordings, message, and location are provided based on the capabilities of the source device (e.g., that of john doe).

An agent may select from the options in the interface to turn monitoring services on/off to intercept communications on the device, retrieve information about communications such as call history and an address book on the phone, and enable location tracking for monitored services (or query current source device location).

When the agent turns on a service, the agency service 115 registers and tests the service with the device (e.g., by processes in FIG. 5, 8, or otherwise described herein). In turn, the agent may select to view monitored communication for the enabled services within the interface menu on the left.

Figure 12:
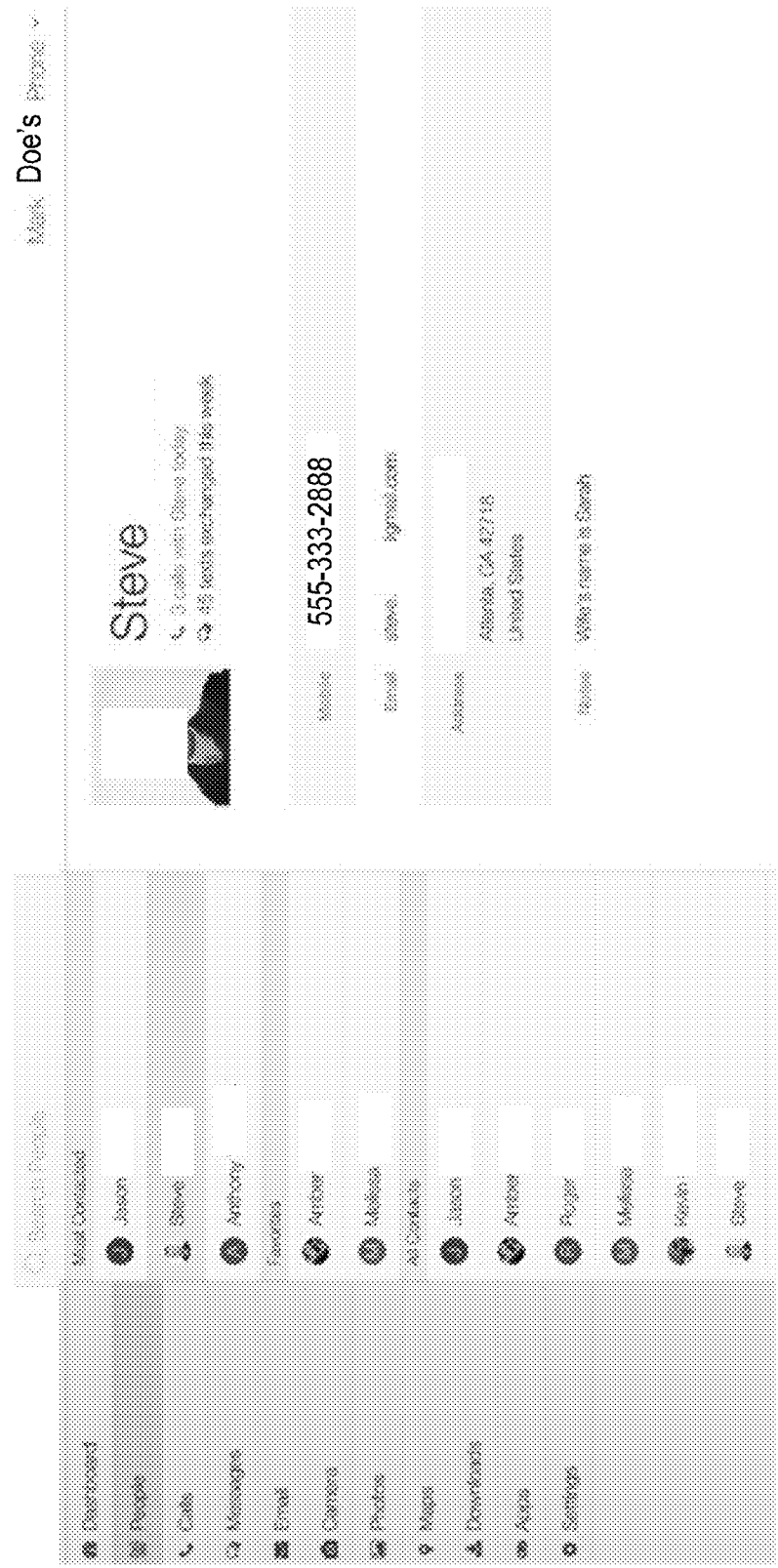
FIG. 12 is a graphical user interface illustrating a contact view for a source device, according to an example embodiment.

FIG. 12 is a graphical user interface illustrating a contact view for a source device according, to an example embodiment. In some embodiments, the GUI is accessible over a network via the interface 145 of the agency service 115 and/or appliance 150 of the agency 110. In other embodiments, the GUI may be generated by a stand-alone application at the agency 110 or agent device 109 and populated with information provided by the interface 145 and/or the appliance 150. As shown in FIG. 12, contacts (e.g., targets) from the source device (e.g., mark doe's phone) are provided to the agency service 115 by a covert application 141 executing on the source device.

As the covert application 141 provides information about communications with the contacts (e.g., Steve) to the agency service 115, the agency service 115 updates the GUI to display communication type (e.g., call or text) and the number of communications (e.g., over a during such as 3 calls today) in addition to the information for the contact received from the covert application.

Figure 13:
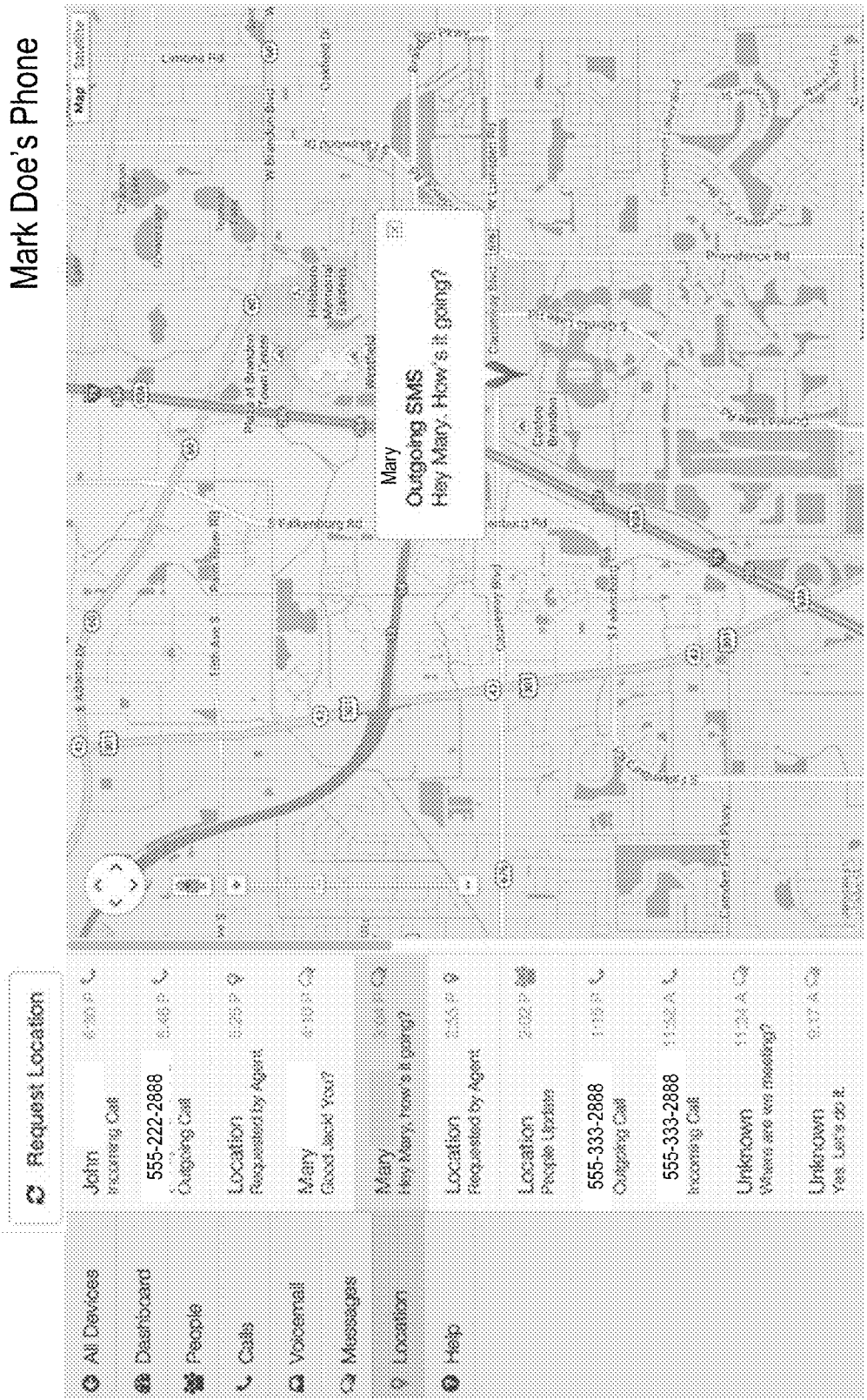
FIG. 13 is a graphical user interface illustrating intercepted communications on a source device with location tracking, according to an example embodiment.

FIG. 13 is a graphical user interface illustrating intercepted communications on a source device with location tracking, according to an example embodiment. In some embodiments, the GUI is accessible over a network via the interface 145 of the agency service 115 and/or appliance 150 of the agency 110. In other embodiments, the GUI may be generated by a stand-alone application at the agency 110 or agent device 109 and populated with information provided by the interface 145 and/or the appliance 150. As shown in FIG. 13, location data received from the source device (e.g., mark doe's phone) is plotted. In some embodiments, the covert application executing on the source device provides locations data in associated with monitored communications on the source device. The agency service 115 plots the received location on the map in response to selection of the corresponding communication. For example, FIG. 13 illustrates the selection of a text communication with Mary Smith displaying the communication contents and the time of the communication. The location the communication took place is plotted on the map. In some embodiments, the location is plotted with information about the communication (e.g., the message contents). Audio communication may be displayed with an option to listen to any generated recording.

Additionally, in some embodiments, the agency service 115 may track sequences of communications (e.g., conversations) between the source device and a target (e.g., Mary Smith). In turn, the agency service 115 may generate a selectable option in the GUI to plot the sequence of communications including audio and/or text communications on the map, which may include an ordered linking or other indication of the sequence the communications took place. The sequence may be filtered to display only locations associated with audio communications or text locations or types of communications over a specified time period.

SUMMARY

The foregoing description of the embodiments has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A computer based method for monitoring communications of a telephonic device, the method comprising:
    transmitting a call forwarding command configured to forward incoming connection requests to the telephonic device to a virtual number;
    receiving, at the telephonic device, a notification of an incoming connection request at the virtual number, the notification comprising number information for a target device associated with the incoming connection request;
    generating, responsive to the notification, a first user interface mimicking receipt of an incoming connection request at the telephonic device from the target device, the first user interface comprising a set of options for acting on the mimicked incoming connection request and information associated with the transmitting number of the target device; and
    responsive to detecting selection of an option in the set of options to accept the mimicked incoming connection request in the set of options:
        generating a second user interface mimicking acceptance of the incoming connection request at the telephonic device from the target device; and
        initiating a connection request to the virtual number for establishing communications between the telephonic device and the target device through the virtual number.

2. The method of claim 1, wherein the information associated with the transmitting number of target device comprises one or more of the transmitting number of the target device and address book information associated with the transmitting number of the target device.

3. The method of claim 1, further comprising modifying a call history of the telephonic device to include an entry indicating receipt of an incoming connection request at the telephonic device from the target device.

4. The method of claim 3, further comprising modifying the entry indicating receipt of an incoming connection request at the telephonic device from the target device with a call duration associated with the communications between the source device and the target device through the virtual number.

5. The method of claim 1, further comprising modifying a call history of the telephonic device to remove an entry associated with the initiating of the connection request to the virtual number.

6. The method of claim 1, wherein the notification is received from an agency service, the method further comprising:
    transmitting information about the detected selection to the agency service, and wherein the agency service is configured to transmit instructions for establishing the communications between the telephonic device and the target device through the virtual number.

7. The method of claim 1, wherein the communications between the telephonic device and the target device through the virtual number are recorded.

8. A computer based method for monitoring communications of a telephonic device, the method comprising:
    detecting, by the telephonic device, initiation of an outbound connection request to a target device;
    responsive to detecting the initiation of the outbound connection request to the target device:
        transmitting, by the telephonic device, a notification of the initiation of the outbound connection request, the notification comprising number information for the target device associated with the outbound connection request; and
        terminating, by the telephonic device, the initiated outbound connection request to the target device; and
    responsive to terminating the initiated outbound connection request to the target device:
        generating, at the telephonic device, a user interface mimicking the initiation of the outbound connection request to the target device; and
        initiating, by the telephonic device, a connection request to a virtual number for establishing communications between the telephonic device and the target device through the virtual number.

9. The method of claim 8, wherein the user interface mimicking the initiation of the outbound connection request to the target device comprises one or more of the transmitting number of the target device and address book information associated with the transmitting number of the target device.

10. The method of claim 8, further comprising modifying an entry of a call history of the telephonic device, the entry associated with the connection request to the virtual number and wherein modifying the entry comprises replacing virtual number information with information associated with the target device.

11. The method of claim 10, wherein the information associated with the target device comprises one or more of the transmitting number of the target device and address book information associated with the transmitting number of the target device.

12. The method of claim 8, further comprising modifying a call history of the telephonic device to remove an entry associated with terminating the outbound connection request to the target device.

13. The method of claim 8, wherein the notification is transmitted to an agency service, the method further comprising:
    initiating the connection request to the virtual number in response to receiving a acknowledgement from agency service indicating readiness of the virtual number for establishing communications between the telephonic device and the target device, and wherein the agency service is configured to transmit instructions for establishing the communications between the telephonic device and the target device through the virtual number.

14. The method of claim 8, further comprising generating a second user interface mimicking establishment of a connection with the target device in response to detecting establishment of communications between the telephonic device and the target device through the virtual number.

15. A system for monitoring communications of a telephonic device, the system comprising:
a server comprising one or more processors and a non-transitory computer-readable storage medium storing computer program code, the computer program code when executed performing steps to:
provide a covert application to the telephonic device, the covert application when executed by the telephonic device configured to:
initiate, in response to receipt of a notification of an inbound connection request from a first target device at a virtual number, a connection request to the virtual number for establishing communications between the telephonic device and the first target device through the virtual number, and wherein a first interface mimics receipt of an incoming connection request from the first target device at the telephonic device based on the received notification;
detect an outbound connection request to a second target device;
transmit a notification of the outbound connection request to the second target device, the notification comprising a transmitting number for the second target device associated with the outbound connection request; and
replace the outbound connection request to the second target device with a connection request to the virtual number for establishing communications between the telephonic device and the second target device through the virtual number, and wherein a second interface mimics initiation of the detected outbound connection request to the second target device;
receive information in response to the inbound connection request from the first target device at the virtual number, the information comprising a transmitting number of the first target device and the virtual number;
identify the telephonic device from a mapping table based on an association of the telephonic device with the virtual number;
transmit the notification of the inbound connection request at the virtual number to the telephonic device, the notification of the inbound connection request comprising the transmitting number of the first target device;
transmit instructions for establishing the communications between the telephonic device and the first target device through the virtual number;
receive the notification of the outbound connection request to the second target device from the telephonic device;
identify the virtual number from the mapping table based on the association of the telephonic device with the virtual number; and
transmit instructions for establishing the communications between the telephonic device and the second target device through the virtual number, the instructions comprising the transmitting number for the second target device.

16. The system of claim 15, wherein the first target device and the second device have a same transmitting number.

17. The system of claim 15, wherein the instructions for establishing the communications between the telephonic device and the second target device through the virtual number further comprises number information for the telephonic device.

18. The system of claim 17, wherein establishing the communications between the telephonic device and the second target device through the virtual number comprises initiating a connection request from the virtual number to the second target device, the virtual number having number information spoofed with the number information for the telephonic device.

19. The system of claim 15, wherein the server further comprises program code for:
provisioning the virtual number based on number information received for the virtual number; and
associating identifying information for the telephonic device with the virtual number in the mapping table, the identifying information comprising a transmitting number of the telephonic device.

20. The system of claim 19, further comprising:
a second server comprising one or more processors and a computer-readable storage medium storing computer program code, the computer program code when executed performing steps to:
establish communications between the telephonic device and a given target device through the virtual number in response to instructions received from the first server; and
record audio from the communications between the telephonic device and the given target telephonic device through the virtual number.

* * * * *